(12) United States Patent
Ruben et al.

(10) Patent No.: US 9,258,480 B2
(45) Date of Patent: Feb. 9, 2016

(54) TECHNIQUES TO SELECTIVELY CAPTURE VISUAL MEDIA USING A SINGLE INTERFACE ELEMENT

(71) Applicant: Facebook, Inc., Menlo Park, CA (US)

(72) Inventors: William M Ruben, San Francisco, CA (US); Daniel J Smith, II, San Francisco, CA (US); Nilesh V Patel, Mountain View, CA (US); Mykyta Lutsenko, London (GB); William J Flynn, San Francisco, CA (US); Andrei V Gheorghe, London (GB)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/287,521

(22) Filed: May 27, 2014

(65) Prior Publication Data

US 2015/0281577 A1  Oct. 1, 2015

Related U.S. Application Data

(60) Provisional application No. 61/973,197, filed on Mar. 31, 2014.

(51) Int. Cl.
*H04N 5/232* (2006.01)
*H04N 1/21* (2006.01)

(52) U.S. Cl.
CPC ......... *H04N 5/23216* (2013.01); *H04N 1/2112* (2013.01); *H04N 5/23245* (2013.01)

(58) Field of Classification Search
CPC ................ H04N 5/23216; H04N 5/23245
See application file for complete search history.

(56) References Cited

U.S. PATENT DOCUMENTS

| 7,391,444 | B1 | 6/2008 | Nomura et al. |
| 8,428,453 | B1 | 4/2013 | Spiegel et al. |
| 2004/0027467 | A1* | 2/2004 | Shiga ........................ 348/231.99 |
| 2009/0036120 | A1 | 2/2009 | Kim et al. |

(Continued)

FOREIGN PATENT DOCUMENTS

| JP | 2002101331 A | * | 4/2002 |
| WO | WO 2013047364 A1 | * | 4/2013 |

OTHER PUBLICATIONS

International Search Report and Written Opinion received for PCT Patent Application No. PCT/US2014/039775, mailed Dec. 16, 2014, 10 pages.

(Continued)

*Primary Examiner* — Timothy J Henn
(74) *Attorney, Agent, or Firm* — Kacvinsky Daisak Bluni PLLC

(57) ABSTRACT

Techniques to selectively capture media using a single user interface element are described. In one embodiment, an apparatus may comprise a touch controller, a visual media capture component, and a storage component. The touch controller may be operative to receive a haptic engagement signal. The visual media capture component may be operative to be configured in a capture mode based on whether a haptic disengagement signal is received by the touch controller before expiration of a first timer, the capture mode one of a photo capture mode or video capture mode, the first timer started in response to receiving the haptic engagement signal, the first timer configured to expire after a first preset duration. The storage component may be operative to store visual media captured by the visual media capture component in the configured capture mode. Other embodiments are described and claimed.

19 Claims, 18 Drawing Sheets

(56) References Cited

U.S. PATENT DOCUMENTS

| | | | |
|---|---|---|---|
| 2011/0061016 A1* | 3/2011 | Song et al. | 715/779 |
| 2011/0264491 A1 | 10/2011 | Birnbaum et al. | |
| 2012/0127088 A1 | 5/2012 | Pance et al. | |
| 2012/0162461 A1* | 6/2012 | Hatanaka | 348/222.1 |
| 2013/0057713 A1 | 3/2013 | Khawand | |
| 2014/0055633 A1 | 2/2014 | Marlin et al. | |
| 2014/0359438 A1* | 12/2014 | Matsuki | 715/702 |

OTHER PUBLICATIONS

Extended European Search Report received for European Patent Application No. 141928875.4, mailed Aug. 4, 2015, 6 pages.

* cited by examiner

TECHNIQUES TO SELECTIVELY CAPTURE VISUAL MEDIA USING A SINGLE INTERFACE ELEMENT

RELATED APPLICATIONS

This application claims the benefit of priority under 35 U.S.C. §119(e) to U.S. Provisional Patent Application No. 61/973,197, titled "Techniques to Selectively Capture Visual Media Using a Single Interface Element," filed on Mar. 31, 2014, which is hereby incorporated by reference in its entirety. This application is related to U.S. patent application Ser. No. 14/244,681, titled "Systems and Methods for Interactive Media Content Exchange," filed on Apr. 3, 2014, which is hereby incorporated by reference in its entirety. This application is related to Patent Cooperation Treaty Application PCT/US14/33698, titled "Systems and Methods for Interactive Media Content Exchange," filed on Apr. 10, 2014, which is hereby incorporated by reference in its entirety.

BACKGROUND

A device may include a media application to capture digital photos or digital video. In many cases, the application needs to be configured into a photo-specific mode or video-specific mode. Switching between modes may cause delays in capturing a scene of interest. Further, multiple inputs may be needed thereby causing further delay. Improvements in media applications may therefore be needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to selectively capture visual media using a single interface element. A touch controller may receive a haptic engagement signal indicating that a user has selected an interface element on a touch screen. A visual media capture component may be configured based on a duration of the user's engagement with the touch screen. The visual media capture component may be configured into a photo-specific mode based on a short duration engagement and into a video-specific mode based on an engagement longer than a set threshold. The visual media capture component may then capture visual media in the configured capture mode. This visual media may then be displayed for the user and optionally transmitted to an Internet-based service. By using a single touch-screen interface element to selectively control photo and/or video capture, users of a visual media application may more quickly and conveniently capture media of their desired type. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
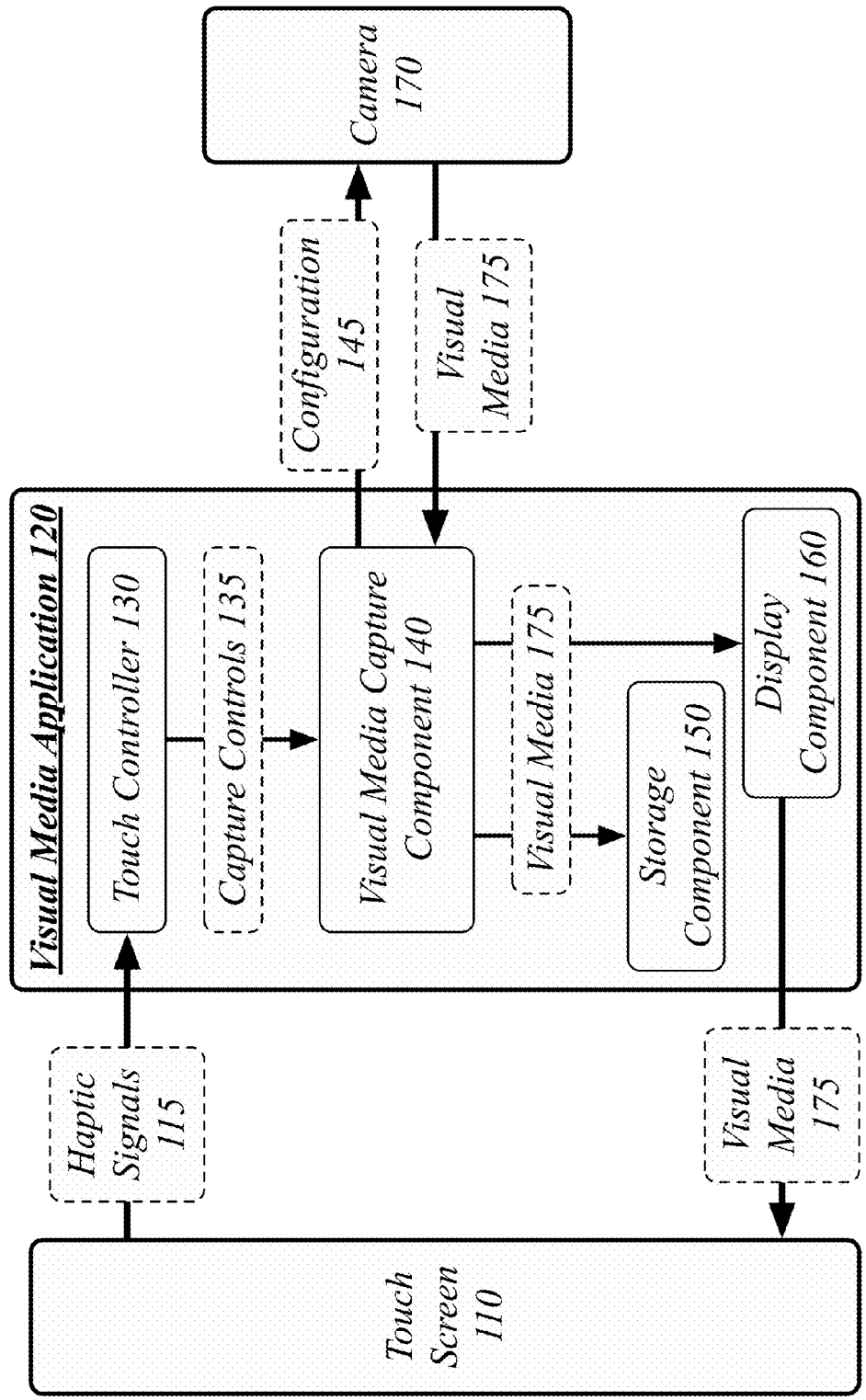
FIG. 1 illustrates an embodiment of a visual media capture system.

Various embodiments are directed to techniques to selectively capture visual media using a single interface element. A visual media application, such as may be installed or come preconfigured on a smart phone device, may be used to capture either or both of digital photos and digital video. In many cases, the smart phone device may be configured into a photo-specific mode or video-specific mode. While the video-specific mode may be used to capture a still image, such as by extracting a frame of a capture video, the photo-specific mode may allow for a higher-quality capture, such as in a higher resolution, with lower compression, and with the assistance of a photo-specific flash.

A visual media application may, on launch, display a preview of the scene visible through the camera element in a live video preview. Configuring the device for video capture may comprise retaining the device in the mode for this live video preview, and may also include activating a steady illumination assistance, such as a light emitting diode (LED) positioned near the camera element, in contrast to the near-instantaneous illumination provided by a flash. It will be appreciated that the same lighting element may be used in both photo capture and video capture modes, but be configured differently in order to provide near-instantaneous or sustained illumination. Alternatively, in some embodiments different lighting elements may be used for photo capture and video capture.

The visual media application may provide a single user interface element, such as an icon, on the touch screen display that can be used for both selecting between photo capture and video capture and initiating the capture in the selected mode. On a tap (a haptic engagement with the user interface element of short duration) a photo may be taken: when the disengagement that marks the conclusion of the tap is detected photo mode is configured and a photo is taken. On a press (a haptic engagement with the user interface element of a duration at least meeting a minimum threshold) a video may be taken: when the haptic engagement endures for at least the minimum threshold, video mode is configured and video recording is begun, lasting until either the haptic contact ends (haptic disengagement) or, optionally, a maximum video duration is reached. The captured visual media—it will be appreciated that video may also include an audio element captured using a microphone—may then be displayed for a user of the smartphone, who may add tags, a note, or other textual elements, and have the option to send the visual media to another user or upload the visual media to an Internet-based service, such as by uploading the captured visual media to a network server. As a result, the embodiments can improve the ease and speed of use of a smartphone-based visual media application.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a visual media capture system 100. In one embodiment, the visual media capture system 100 may comprise a computer-implemented system having a software-based visual media application 120 comprising one or more components. Although the visual media capture system 100 shown in FIG. 1 has a limited number of elements in a certain topology, it may be appreciated that the visual media capture system 100 may include more or less elements in alternate topologies as desired for a given implementation.

The visual media capture system 100 may comprise the visual media application 120. The visual media application 120 may be generally arranged to receive haptic signals 115 from a touch screen 110, configure a camera 170 based on the haptic signals 115, capture visual media 175 using the camera 170, store the visual media 175, and display the visual media 175 using touch screen 110. In some embodiments, the visual media 175 may be displayed using the touch screen 110 for user approval prior to being stored.

The visual media application 120 may comprise a touch controller 130. The touch controller 130 may be generally arranged to receive haptic signals 115. Haptic signals 115 may include a haptic engagement signal and/or a haptic disengagement signal. Haptic engagement may be read from anywhere on a touch screen 110 or may be limited to a specific area of the touch screen 110, such as a visual media capture icon. In some embodiments, haptic engagement may only initiate visual media capture if engagement is with the area of the screen corresponding to the visual media capture icon.

In some embodiments, once haptic engagement is detected, the engagement may be considered sustained even if user engagement with the touch screen wanders outside the area of the screen corresponding to the visual media capture icon, as may occur during user manipulation of the device during photo or video capture. The amount of deviation allowed from the visual media capture icon may be limited by a number of points or pixels, such as 40 pixels. The touch controller 130 may transmit capture controls 135 to the visual media capture component 140 in order to indicate how the visual media capture component 140 should operate. Where user engagement wanders outside even this increased allowable area, this may be considered to be haptic disengagement insofar as visual media capture is concerned. In some embodiments, haptic engagement may be considered to be sustained so long as haptic contact is maintained with any portion of the touch screen.

The touch controller may receive the haptic disengagement signal before expiration of the first timer and, in response, use capture controls 135 to command the visual media capture component 140 to capture a photo. The touch controller may not receive a haptic disengagement signal before expiration of the first timer and, in response to the expiration of the first timer, use capture controls 135 to command the visual media capture component 140 to begin capturing video. Video capture may be concluded based on either receiving a haptic disengagement signal or based on the expiration of a second timer started at the initiation of capturing the visual media 175 as video, the second timer configured to expire after a second preset duration. This second preset duration may correspond to a maximum video duration, such as a maximum video duration supported by a visual media sharing service or social networking service.

The visual media application 120 may comprise a visual media capture component 140. The visual media capture component 140 may be generally arranged to be configured in a capture mode based on whether a haptic disengagement signal is received by the touch controller 130 before expiration of a first timer. This first timer may be started in response to receive a haptic engagement signal and be configured to expire after a first preset duration. This first preset duration may be a threshold duration distinguishing between whether haptic engagement with the touch screen is long enough to be considered a press instead of a tap. This first preset duration may be configured by default as, for example, 400 milliseconds. The default first preset duration may be a default of the visual media application 120 or of the platform used by the visual media application 120, such as the capture device or operating system for the capture device. This first preset duration may be user-configurable. The visual media capture component 140 may be configured in one of a photo capture mode or video capture mode. Configuring the visual media capture component 140 in a photo mode or video capture mode may result in the visual media capture component 140 using configuration 145 to adjust settings for the camera 170. Configuration 145 may include settings for capture resolution, camera focus, level of compression, flash or illumination activation, and any other known camera settings.

The visual media capture component 140 may receive visual media 175 captured by the camera 170 in response to transmitting to the camera 170—such as by using an operating system as an intermediary—a command to begin video capture or take a photograph. Visual media capture component 140 may transmit the visual media 175 to a storage component 150 for storage and to a display component 160 for display for the user. In some embodiments, the display component 160 may display the visual media 175 for the user using the touch screen 110 and allow the user to determine whether or not to store the captured visual media 175, with the visual media 175 only being stored if the user elects to keep it. If the user elects to store the captured visual media 175 they may also be provided with the opportunity to select recipients for the visual media 175 and add tags or a note.

Tagging visual media 175 may consist of adding text captions, adding a voice note, adding a comment, adding a text description, adding a voice description, or any other individual or combined use of text and audio to augment the captured visual media 175. Where audio is used to augment the captured visual media 175, this audio may be captured separately from the initial visual media capture, such as during a period in which the user may examine the captured visual media 175 and decide whether to tag, store, and/or share. Tagging visual media 175 may include identifying one or more subjects of the visual media 175, such as by selecting an area within the visual media 175 corresponding to a specific subject. Where a specific subject is selected, a user may be prompted and empowered to associate that area of the visual media 175 with a known contact, such as a user contact stored on the capture device, or such as a known friend or other acquaintance on a social networking service.

Tagging visual media 175 may include associating the visual media 175 with contextual metadata. Visual media 175 may be tagged with contextual information including, without limitation, any combination of: a property, an identifier for a computing device that captured the visual media 175, a speed at which the capturing computing device was moving or being moved when the visual media 175 was captured, a direction in which the capturing computing device was moving or being moved when the visual media 175 was captured, linear and/or rotational acceleration that the capturing computing device was experiencing when the visual media 175 was captured, an orientation of the capturing computing device when the visual media 175 was captured, a geographic location at which the capturing computing device was located when the visual media 175 was captured, the time at which the visual media 175 was captured, the settings for the camera 170 of the capturing computing device when the visual media 175 was captured (including, for example, configuration 145), the weather conditions surrounding the capturing computing device when the visual media 175 was captured, and a title and other metadata of a media being accessed (e.g., a song being played) by the capturing computing device when the visual media 175 was captured.

The visual media application 120 may comprise a storage component 150. The storage component 140 may be generally arranged to receive visual media 175 from the visual media capture component 140 and to store the visual media 175. Storing the visual media 175 may correspond to either or both of storing the visual media 175 locally on the device or by uploading the visual media 175 to a network server, such as a network server operated by a visual media sharing service or social networking service.

The visual media application 120 may allow a user to specific privacy settings. The visual media application 120 may require a user to opt-in to a privacy agreement prior to sharing any visual media, such as visual media 175. For instance, during installation, initial configuration, initial account setup, linking to an existing account, or any other time prior to the sharing of visual media 175, the visual media application 120 may first require the user to acknowledge that any visual media 175 shared may be accessed by others. The user opt-in may include intellectual property provisions, such as establishing ownership, access rights, distribution rights, and other considerations relevant to the generation and distribution of visual media 175.

The visual media application 120 may comprise a display component 160. The display component 160 may be generally arranged to display the visual media 175 using the touch screen 110.

In some embodiments, a minimum video duration may be imposed by a smartphone, a smartphone operating system, or a smartphone visual capture library. For example, a smartphone may be unable to capture video of less than 2 or 3 seconds in duration. As such, a third timer may be started at initiation of capturing the visual media 175 as video, the third timer configured to expire after a third preset duration, the third preset duration corresponding to a restriction on minimum video length imposed by the smartphone, smartphone operating system, smartphone visual capture library, or other element of the smartphone software or hardware system. Alternatively or additionally, the third preset duration may correspond to a minimum video length imposed by visual media application 120 or a service for sharing captured visual media 175, such as may be imposed in order to avoid a poor user experience of receiving a video of insubstantial length. If the touch controller 130 receives a haptic disengagement signal during video capture (such as may be initiated after expiration of the first timer) and before expiration of the third timer, the visual media capture component 140 may cancel capture of the visual media 175 in response. In some cases, the visual media capture component 140 may then proceed to capture a photo in response to the video capture being cancelled.

In some embodiments, both a picture and video may be captured. The touch controller 130 may be operative to receive a haptic engagement signal and transmit capture controls 135 to the visual media capture component 140 in response. The visual media capture component 140 may be operative to be configured in a photo capture mode in response to receiving the haptic engagement signal, capture a photograph using the photo capture mode, be configured in a video capture mode after capturing the photograph, and capture a video using the video capture mode.

Figure 2:
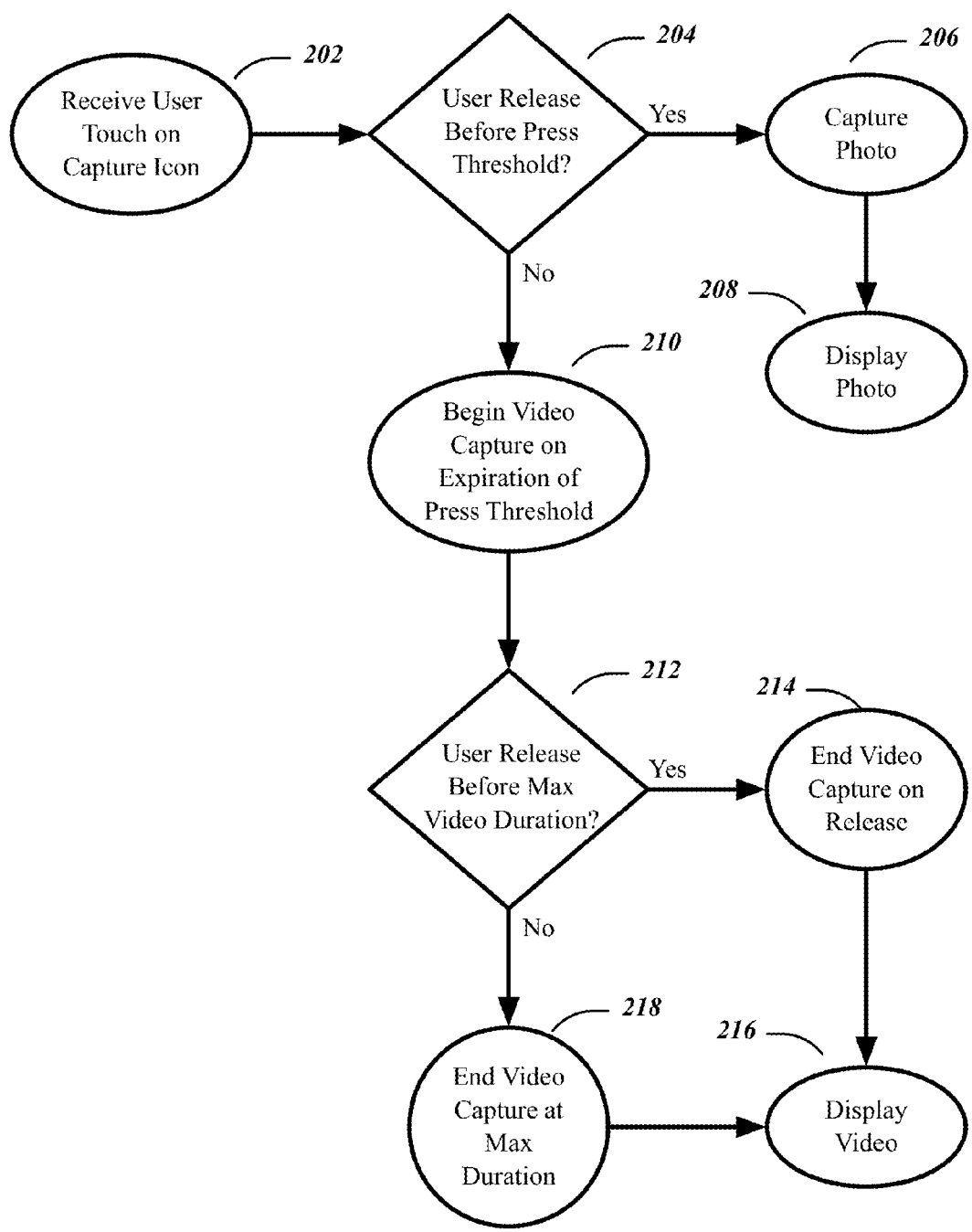
FIG. 2 illustrates an embodiment of a first logic flow for the visual media capture system of FIG. 1.

FIG. 2 illustrates an embodiment of a logic flow 200 for the visual media capture system 100 of FIG. 1. The logic flow 200 may be representative of some or all of the operations executed by one or more embodiments described herein.

In the illustrated embodiment shown in FIG. 2, the logic flow 200 may receive a user touch on a capture icon at block 202. For example, the user touch may be received a haptic engagement signal. In response, the logic flow 200 may start a first timer configured to expire after a first preset duration.

The logic flow 200 may determine whether the user has released their touch before a press threshold at block 204. Determining that the user has released their touch may correspond to receiving a haptic disengagement signal from the touch screen 110. The press threshold may correspond to the first preset duration, such that the user will have released their touch before the press threshold if the first time has not yet expired. If the user released before the press threshold, this may be interpreted as a request to take a photo, and the logic flow 200 may continue to block 206. Otherwise, the logic flow 200 may proceed to block 210.

The logic flow 200 may capture a photo at block 206. Capturing a photo may include configuring a camera 170 to be in a photo capture mode and then instructing the camera 170 to take a photo.

The logic flow 200 may display the photo at block 208. The photo may be displayed with accompanying controls for the addition of tags, for storing the photo, and/or for sharing the photo.

The logic flow 200 may begin video capture on expiration of the press threshold at block 210. Beginning video capture may include configuring a camera 170 into a video mode; however, in some embodiments, the camera 170 may already be in a video capture mode in order to provide a live video preview. The logic flow 200 may determine that the first timer has expired and configure a visual media capture component 140 in a video capture mode in response to determining that the first timer has expired.

The logic flow 200 may determine whether the user has released their touch before a max video duration at block 212. Determining that the user has released their touch may correspond to receiving a haptic disengagement signal from the touch screen 110. The max video duration may, for example, correspond to a maximum video duration supported by an Internet-based visual media sharing service. The maximum video duration may be 8 seconds, 10 seconds, or other duration appropriate for the recording of short interpersonal videos for sharing through a social networking service. If the user released before the max video duration, the logic flow 200 may continue to block 214. Otherwise, the logic flow 200 may proceed to block 218.

Whether the maximum video duration has been reached may be determined by starting a second timer at initiation of capturing the visual media 175 as video, the second timer configured to expire after a second preset duration. Determining that the maximum video duration has been reached may therefore be performed by determining that the second timer has expired. As such, the logic flow 200 may complete capture of the visual media 175 in response to determining that the second timer has expired.

The logic flow 200 may end video capture on release at block 214 and then proceed to block 216. Ending video capture may comprise ending the transfer of visual media information to short-term memory and then transferring the visual media information captured in the short-term memory to persistent storage. Alternatively, the visual media information may only be transferred to persistent storage upon a user specifically indicating that the photo should be stored.

The logic flow 200 may display the captured video at block 216. The video may be displayed with accompanying controls for the addition of tags, for storing the video, and/or for sharing the video.

The logic flow 200 may end video capture at the max video duration at block 218 and then proceed to block 216 to display the captured video.

Figure 3:
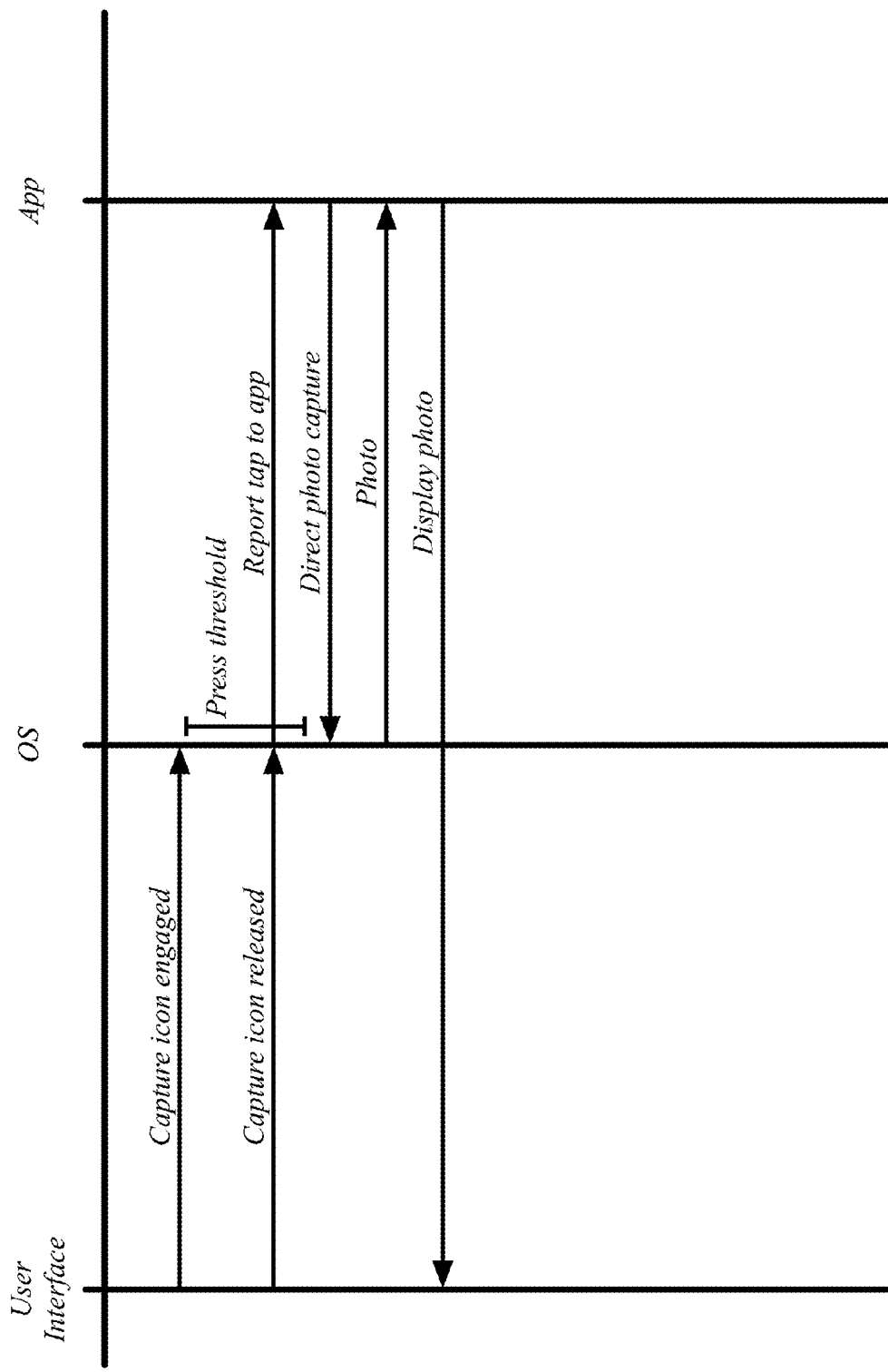
FIG. 3 illustrates an interaction diagram for the visual media capture system receiving a tap.

FIG. 3 illustrates an interaction diagram for the visual media capture system 100 receiving a tap.

As shown in FIG. 3, the user interface receives a capture icon being engaged, which is processed by an operating system (OS). The OS engages a timer with a press threshold with a set length to distinguish between a tap and a press. The user interface receives a capture icon being released, which is processed by the OS, which it determines occurred before the press threshold is reached. As a result, the OS reports a tap to the app, which may correspond to the visual media application 120. The app therefore directs the OS to capture a photo. The OS returns, in response, a photo. The app then displays the photo on the user interface, with the OS serving as an intermediary.

It will be appreciated that, in some embodiments, the app may receive indication of the capture icon being engaged immediately, prior to the OS determining that a tap or press has been performed. In these embodiments, the app may carry out the described functions of the OS in determining whether haptic engagement corresponds to a tap or press.

Figure 4:
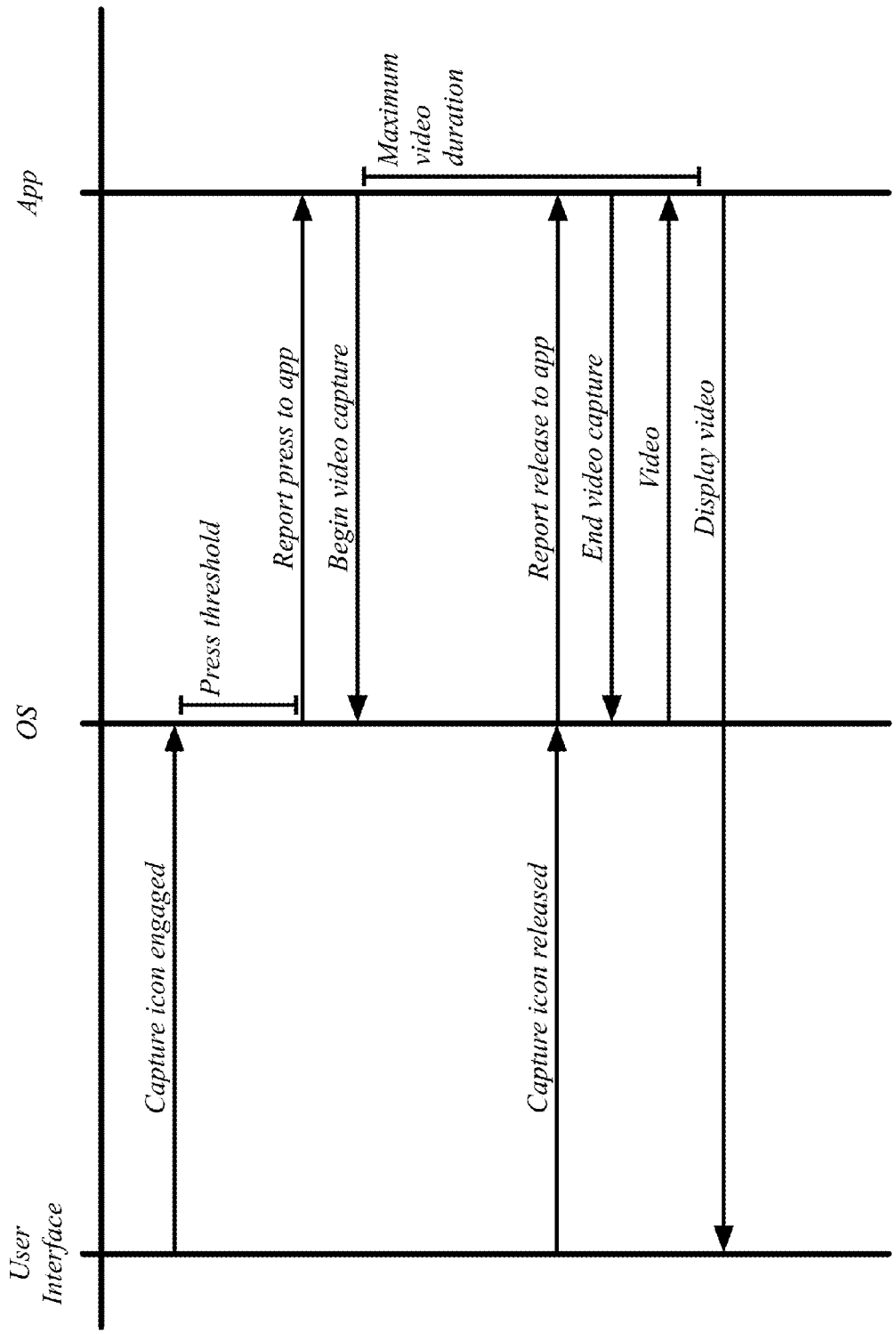
FIG. 4 illustrates an interaction diagram for the visual media capture system receiving a short press.

FIG. 4 illustrates an interaction diagram for the visual media capture system 100 receiving a short press.

As shown in FIG. 4, the user interface receives a capture icon being engaged, which is processed by an operating system (OS). The OS engages a timer with a press threshold with a set length to distinguish between a tap and a press. The user interface determines that the capture icon has been engaged for longer than the press threshold. As a result, the OS reports a press is being performed to the app, which may correspond to the visual media application 120. The app therefore directs the OS to begin capturing video.

The user interface receives the capture icon being released, which is processed by the OS. The OS reports that release of the press to the app. The app therefore directs the OS to end capturing video. The OS returns the video to the app. It will be appreciated that, in some embodiments, the video may be continuously or iteratively received by the app during video capture rather than received as a single unit after capture has completed. The app then displays the video on the user interface, with the OS serving as an intermediary. The returned video may be stored in persistent storage upon it being returned to the app or, alternatively, the transfer to persistent storage may be delayed until a user indicates that the video should be stored.

Figure 5:
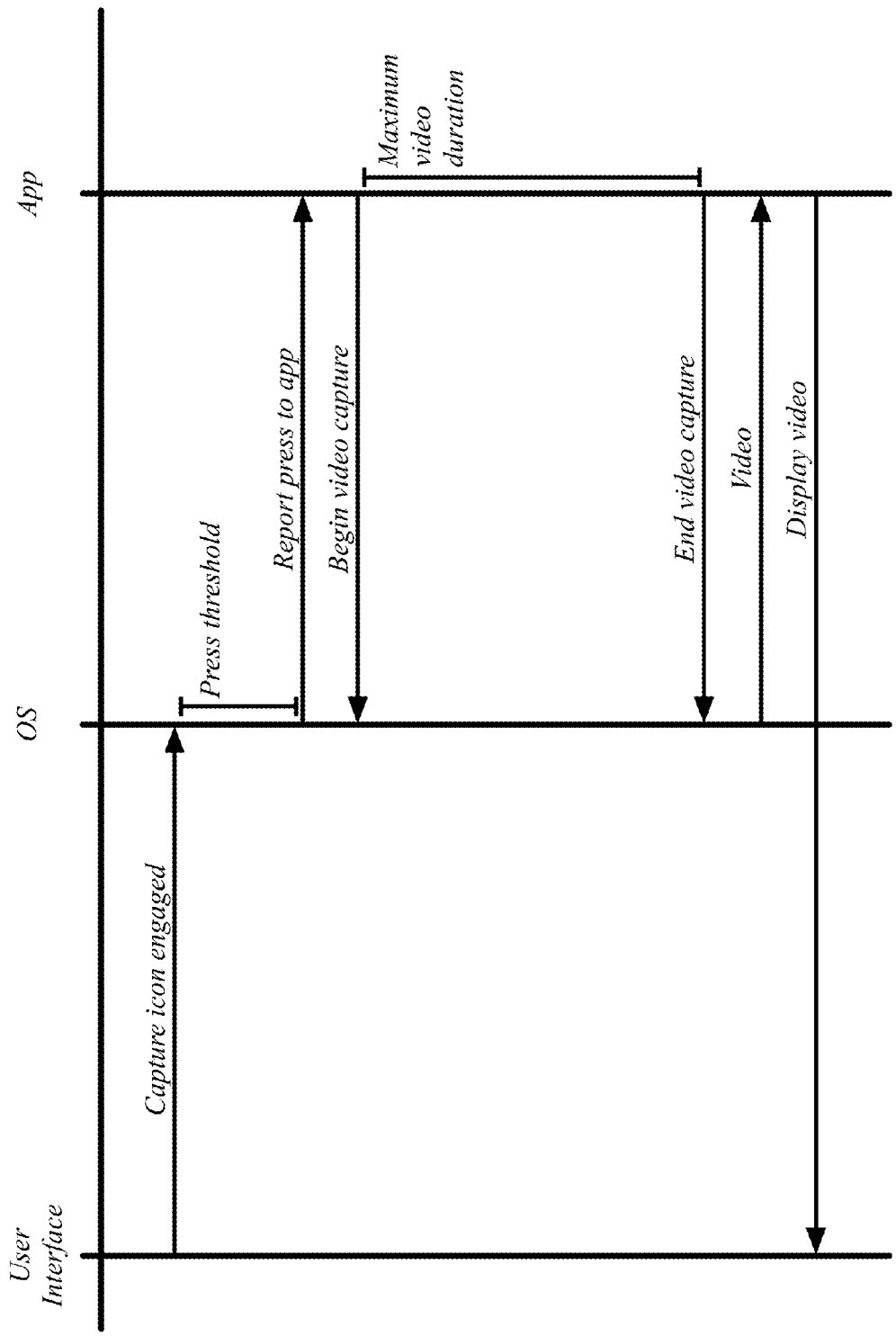
FIG. 5 illustrates an interaction diagram for the visual media capture system receiving a press longer than the maximum video duration.

FIG. 5 illustrates an interaction diagram for the visual media capture system 100 receiving a press longer than the maximum video duration.

As shown in FIG. 5, the user interface receives a capture icon being engaged, which is processed by an operating system (OS). The OS engages a timer with a press threshold with a set length to distinguish between a tap and a press. The user interface determines that the capture icon has been engaged for longer than the press threshold. As a result, the OS reports a press is being performed to the app, which may correspond to the visual media application 120. The app therefore directs the OS to begin capturing video.

Prior to the user interface receiving the capture icon being released, the app determines that a maximum video duration has been reached. The app therefore directs the OS to end capturing video. The OS returns the video to the app. It will be appreciated that, in some embodiments, the video may be continuously or iteratively received by the app during video capture rather than received as a single unit after capture has completed. The app then displays the video on the user interface, with the OS serving as an intermediary. The returned video may be stored in persistent storage upon it being returned to the app or, alternatively, the transfer to persistent storage may be delayed until a user indicates that the video should be stored.

Figure 6A:
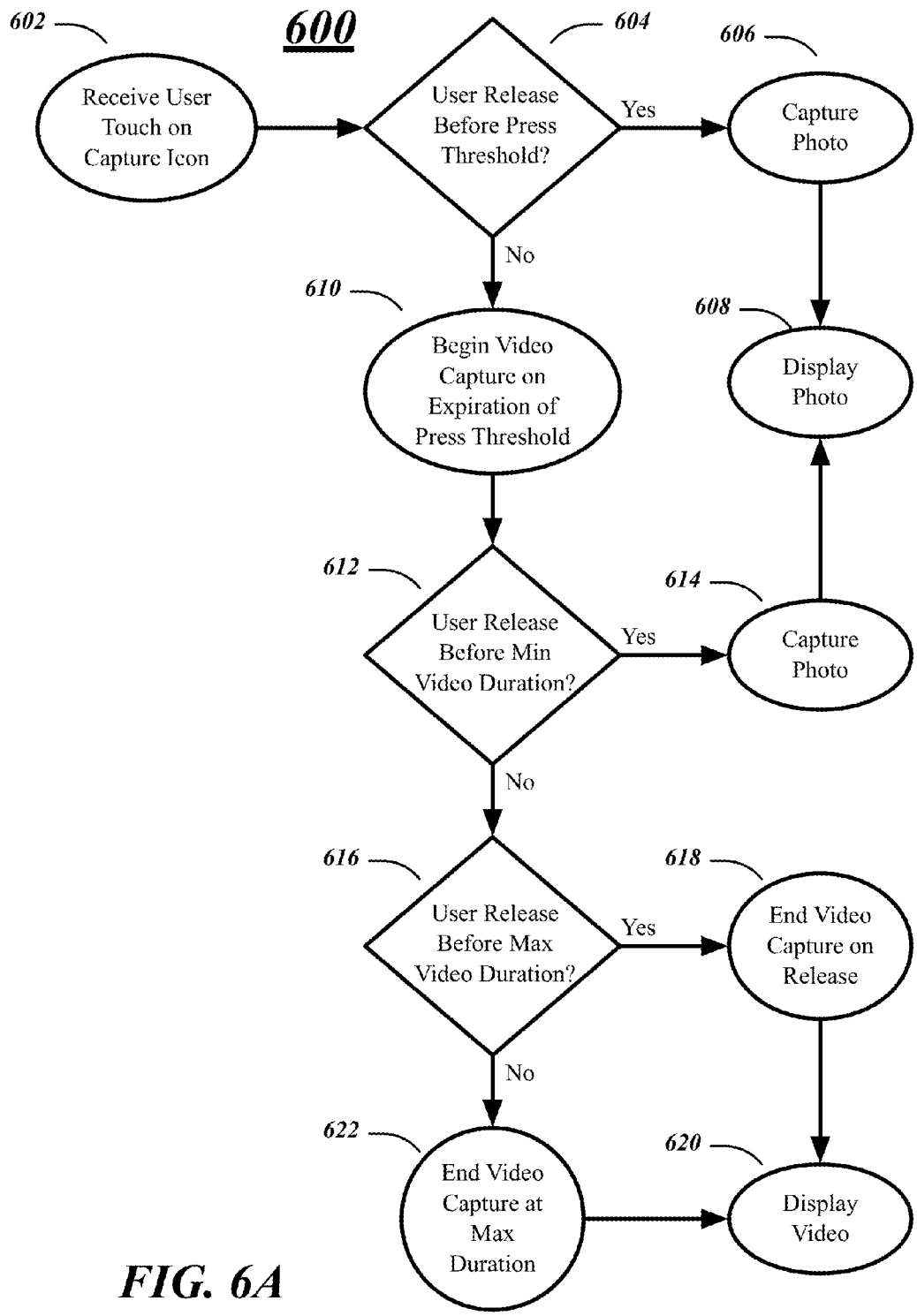
FIG. 6A illustrates an embodiment of a second logic flow for the visual media capture system of FIG. 1.

FIG. 6A illustrates an embodiment of a second logic flow 600 for the visual media capture system 100 of FIG. 1. The logic flow 600 may be representative of some or all of the operations executed by one or more embodiments described herein.

In the illustrated embodiment shown in FIG. 6, the logic flow 600 may receive a user touch on a capture icon at block 602. For example, the user touch may be received a haptic engagement signal. In response, the logic flow 600 may start a first timer configured to expire after a first preset duration.

The logic flow 600 may determine whether the user has released their touch before a press threshold at block 604. Determining that the user has released their touch may correspond to receiving a haptic disengagement signal from the touch screen 110. The press threshold may correspond to the first preset duration, such that the user will have released their touch before the press threshold if the first time has not yet expired. If the user released before the press threshold, this may be interpreted as a request to take a photo, and the logic flow 600 may continue to block 606. Otherwise, the logic flow 600 may proceed to block 610.

The logic flow 600 may capture a photo at block 606. Capturing a photo may include configuring a camera 170 to be in a photo capture mode and then instructing the camera 170 to take a photo.

The logic flow 600 may display the photo at block 608.

The logic flow 600 may begin video capture on expiration of the press threshold at block 610. Beginning video capture may include configuring a camera 170 into a video mode; however, in some embodiments, the camera 170 may already be in a video capture mode in order to provide a live video preview. The logic flow 600 may determine that the first timer has expired and configure a visual media capture component 140 in a video capture mode in response to determining that the first timer has expired.

The logic flow 600 may determine whether the user has released their touch before a min video duration at block 612. Determining that the user has released their touch may correspond to receiving a haptic disengagement signal from the touch screen 110. The min video duration may, for example, correspond to a minimum video duration supported by the camera 170 or the smartphone device. The minimum video duration may be 2 seconds, 3 seconds, or otherwise as specific to a particular device. If the user released before the min video duration, the logic flow 600 may continue to block 614. Otherwise, the logic flow 600 may proceed to block 616.

The logic flow may capture a photo at block 614. Capturing a photo may include configuring a camera 170 to be in a photo capture mode and then instructing the camera 170 to take a photo. With the user having failed to reach the minimum video duration, it may be impossible for the device hardware to successfully record a video. As such, the logic flow 600 may adapt by taking a photo for the user so that some record of the subject scene is preserved.

The logic flow 600 may determine whether the user has released their touch before a max video duration at block 616. Determining that the user has released their touch may correspond to receiving a haptic disengagement signal from the touch screen 110. The max video duration may, for example, correspond to a maximum video duration supported by an Internet-based visual media sharing service. The maximum video duration may be 8 seconds, 10 seconds, or other duration appropriate for the recording of short interpersonal videos for sharing through a social networking service. If the user released before the max video duration, the logic flow 600 may continue to block 618. Otherwise, the logic flow 600 may proceed to block 622.

Whether the maximum video duration has been reached may be determined by starting a second timer at initiation of capturing the visual media 175 as video, the second timer configured to expire after a second preset duration. Determining that the maximum video duration has been reached may therefore be performed by determining that the second timer has expired. As such, the logic flow 600 may complete capture of the visual media 175 in response to determining that the second timer has expired.

The logic flow 600 may end video capture on release at block 618 and then proceed to block 620.

The logic flow 600 may display the captured video at block 620.

The logic flow 600 may end video capture at the max video duration at block 622 and then proceed to block 620 to display the captured video.

Figure 6B:
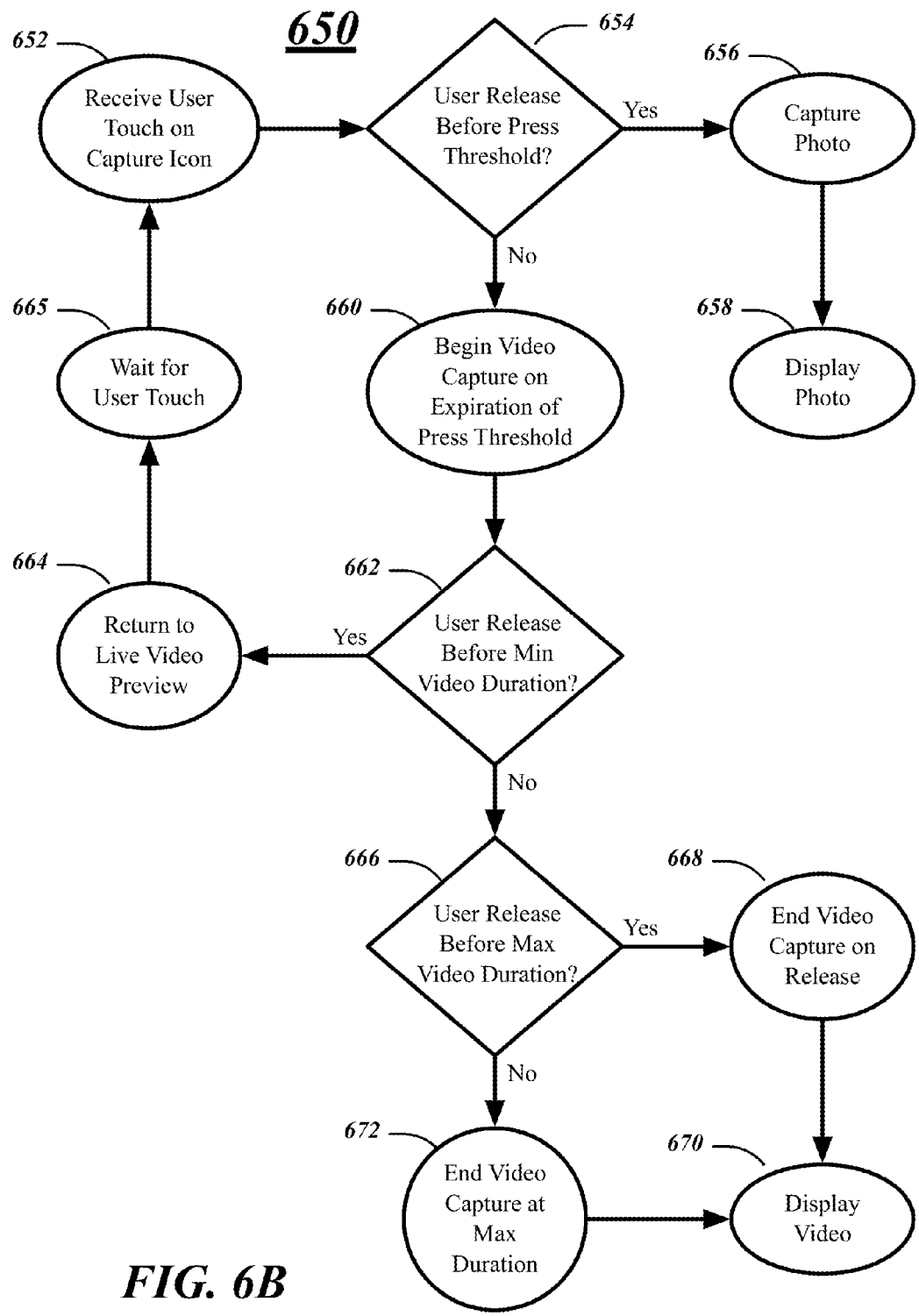
FIG. 6B illustrates an embodiment of a third logic flow for the visual media capture system of FIG. 1.

FIG. 6B illustrates an embodiment of a third logic flow 650 for the visual media capture system 100 of FIG. 1. The logic flow 650 may be representative of some or all of the operations executed by one or more embodiments described herein.

In the illustrated embodiment shown in FIG. 6, the logic flow 650 may receive a user touch on a capture icon at block 652. For example, the user touch may be received a haptic engagement signal. In response, the logic flow 650 may start a first timer configured to expire after a first preset duration.

The logic flow 650 may determine whether the user has released their touch before a press threshold at block 654. Determining that the user has released their touch may correspond to receiving a haptic disengagement signal from the touch screen 110. The press threshold may correspond to the first preset duration, such that the user will have released their touch before the press threshold if the first time has not yet expired. If the user released before the press threshold, this may be interpreted as a request to take a photo, and the logic flow 650 may continue to block 656. Otherwise, the logic flow 650 may proceed to block 660.

The logic flow 650 may capture a photo at block 656. Capturing a photo may include configuring a camera 170 to be in a photo capture mode and then instructing the camera 170 to take a photo.

The logic flow 650 may display the photo at block 658.

The logic flow 650 may begin video capture on expiration of the press threshold at block 660. Beginning video capture may include configuring a camera 170 into a video mode; however, in some embodiments, the camera 170 may already be in a video capture mode in order to provide a live video preview. The logic flow 650 may determine that the first timer has expired and configure a visual media capture component 140 in a video capture mode in response to determining that the first timer has expired.

The logic flow 650 may determine whether the user has released their touch before a min video duration at block 662. Determining that the user has released their touch may correspond to receiving a haptic disengagement signal from the touch screen 110. The min video duration may, for example, correspond to a minimum video duration supported by the camera 170 or the smartphone device. The minimum video duration may be 2 seconds, 3 seconds, or otherwise as specific to a particular device. If the user released before the min video duration, the logic flow 650 may continue to block 664. Otherwise, the logic flow 650 may proceed to block 666.

The logic flow may return to live video preview at block 664. With the user having failed to reach the minimum video duration, it may be impossible for the device hardware to successfully record a video. Returning to a live video preview may include configuring a camera 170 to be in a live video preview mode. It will be appreciated that a camera 170 may transition from a live video preview mode into either photo capture or video capture based on user command, that the live video preview provides a preview for both video and photo capture. The logic flow 650 may then proceed to block 665.

The logic flow 650 may wait for further user touch at block 665. With the camera 170 and touch screen 110 being used for live video preview, the visual media application 120 may continue showing the user the scene available for capture and wait for the user to initiate capture through haptic contact with the capture icon. The logic flow 650 may transition back to block 652 once a user touch is received. It will be appreciated that the visual media application 120 may also transition to states other than block 652, due to, for example, other user interface elements of visual media application 120 being selected or the visual media application 120 being closed.

The logic flow 650 may determine whether the user has released their touch before a max video duration at block 666. Determining that the user has released their touch may correspond to receiving a haptic disengagement signal from the touch screen 110. The max video duration may, for example, correspond to a maximum video duration supported by an Internet-based visual media sharing service. The maximum video duration may be 8 seconds, 10 seconds, or other duration appropriate for the recording of short interpersonal videos for sharing through a social networking service. If the user released before the max video duration, the logic flow 650 may continue to block 668. Otherwise, the logic flow 650 may proceed to block 672.

Whether the maximum video duration has been reached may be determined by starting a second timer at initiation of capturing the visual media 175 as video, the second timer configured to expire after a second preset duration. Determining that the maximum video duration has been reached may therefore be performed by determining that the second timer has expired. As such, the logic flow 650 may complete capture of the visual media 175 in response to determining that the second timer has expired.

The logic flow 650 may end video capture on release at block 668 and then proceed to block 670.

The logic flow 650 may display the captured video at block 670.

The logic flow 650 may end video capture at the max video duration at block 672 and then proceed to block 670 to display the captured video.

Figure 7:
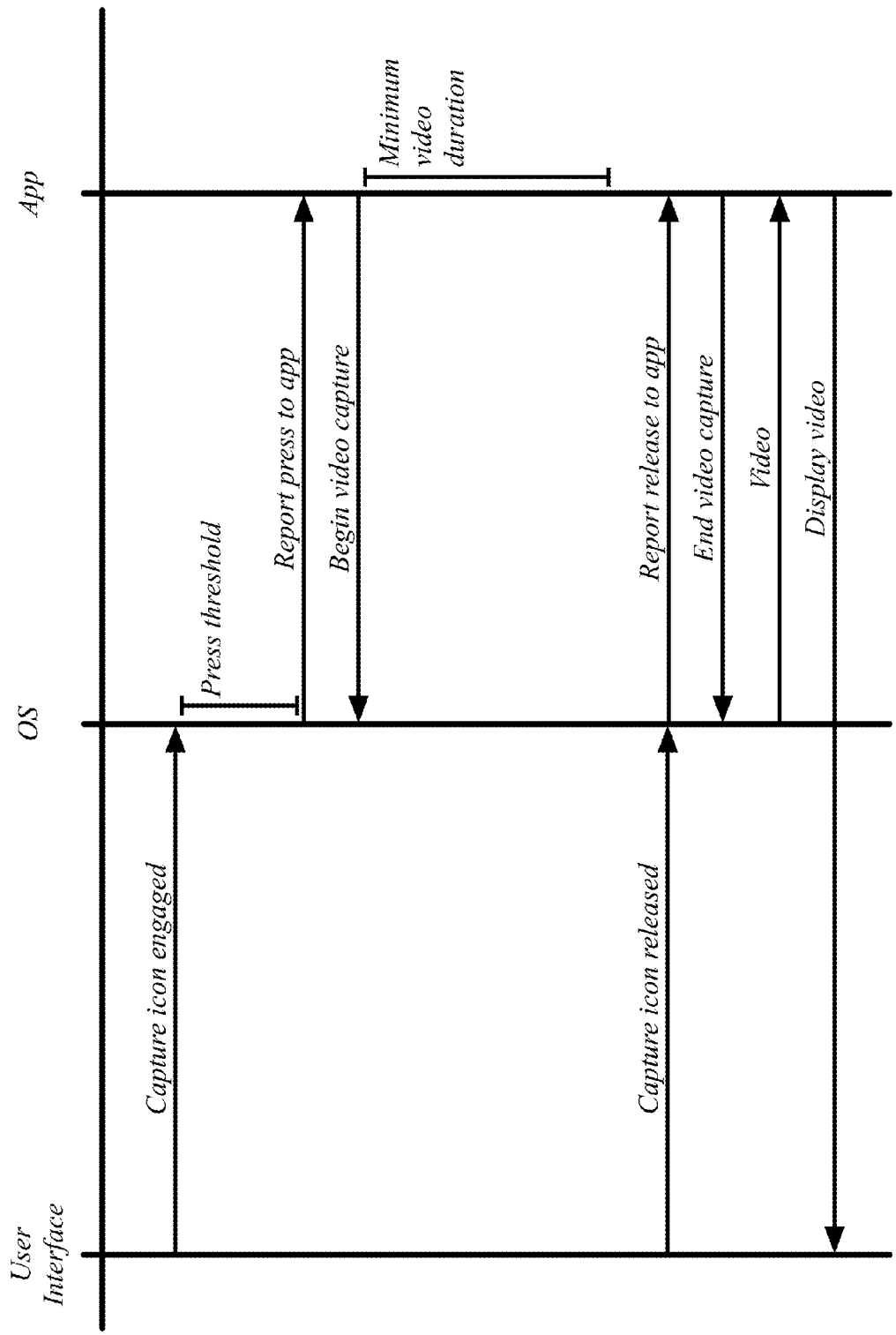
FIG. 7 illustrates an interaction diagram for the visual media capture system receiving a press sufficiently long to meet a minimum video duration.

FIG. 7 illustrates an interaction diagram for the visual media capture system 100 receiving a press sufficiently long to meet a minimum video duration.

As shown in FIG. 7, the user interface receives a capture icon being engaged, which is processed by an operating system (OS). The OS engages a timer with a press threshold with a set length to distinguish between a tap and a press. The user interface determines that the capture icon has been engaged for longer than the press threshold. As a result, the OS reports a press is being performed to the app, which may correspond to the visual media application 120. The app therefore directs the OS to begin capturing video.

The user interface receives the capture icon being released, which is processed by the OS. The OS reports that release of the press to the app. The app therefore directs the OS to end capturing video. As the minimum video duration has been met, the OS returns the video to the app. It will be appreciated that, in some embodiments, the video may be continuously or iteratively received by the app during video capture rather than received as a single unit after capture has completed. The app then displays the video on the user interface, with the OS serving as an intermediary. The returned video may be stored in persistent storage upon completion of it being captured or, alternatively, the transfer to persistent storage may be delayed until a user indicates that the video should be stored.

Figure 8A:
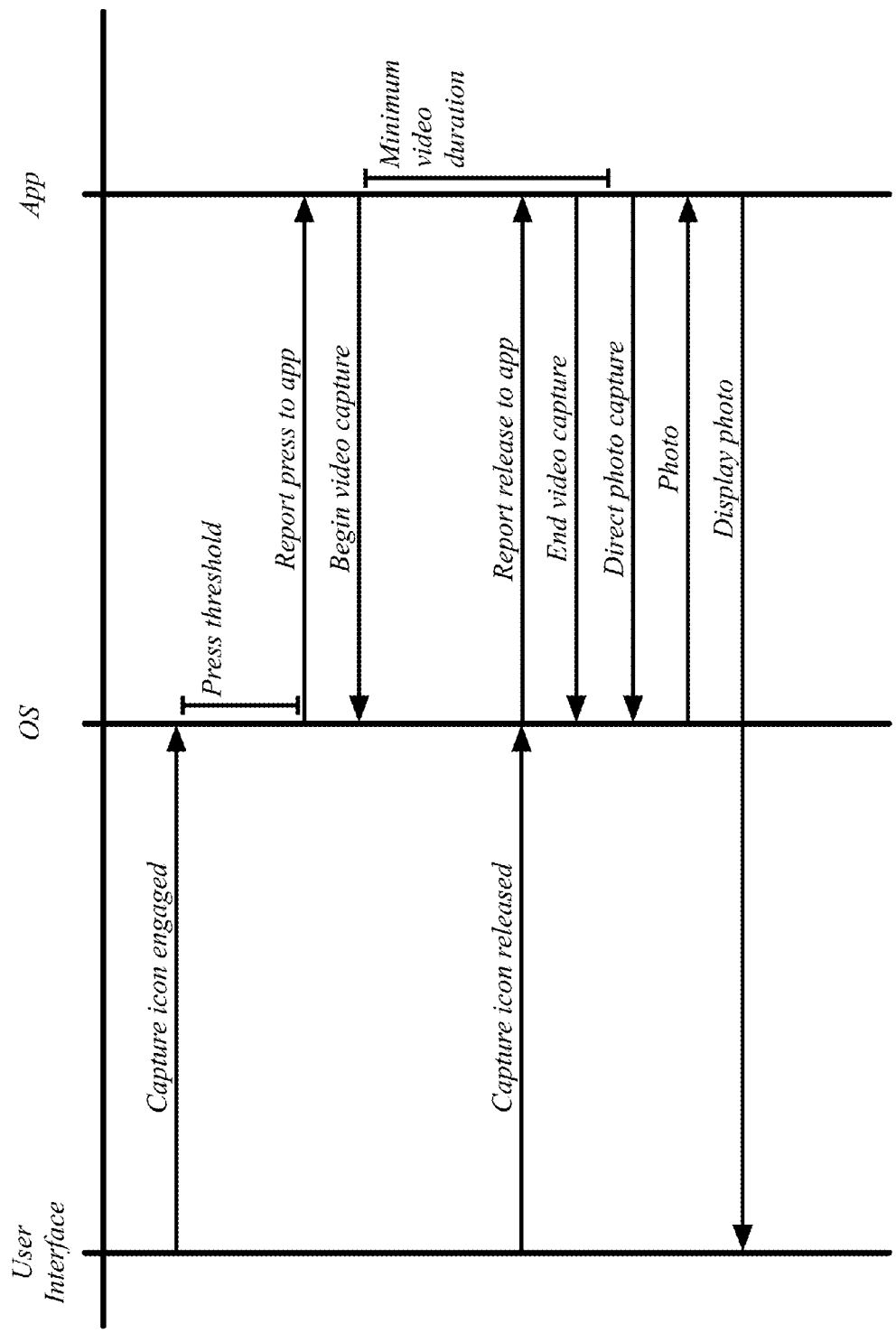
FIG. 8A illustrates a first interaction diagram for the visual media capture system receiving a press insufficiently long to meet a minimum video duration.

FIG. 8A illustrates a first interaction diagram for the visual media capture system 100 receiving a press insufficiently long to meet a minimum video duration.

As shown in FIG. 8, the user interface receives a capture icon being engaged, which is processed by an operating system (OS). The OS engages a timer with a press threshold with a set length to distinguish between a tap and a press. The user interface determines that the capture icon has been engaged for longer than the press threshold. As a result, the OS reports a press is being performed to the app, which may correspond to the visual media application 120. The app therefore directs the OS to begin capturing video.

The user interface receives the capture icon being released, which is processed by the OS. The OS reports that release of the press to the app. The app therefore directs the OS to end capturing video. As the minimum video duration has not been met, the OS is unable to return the video to the app. Because no video can be stored, the app directs the OS to capture a photo. The OS returns, in response, a photo. The app then displays the photo on the user interface, with the OS serving as an intermediary.

Figure 8B:
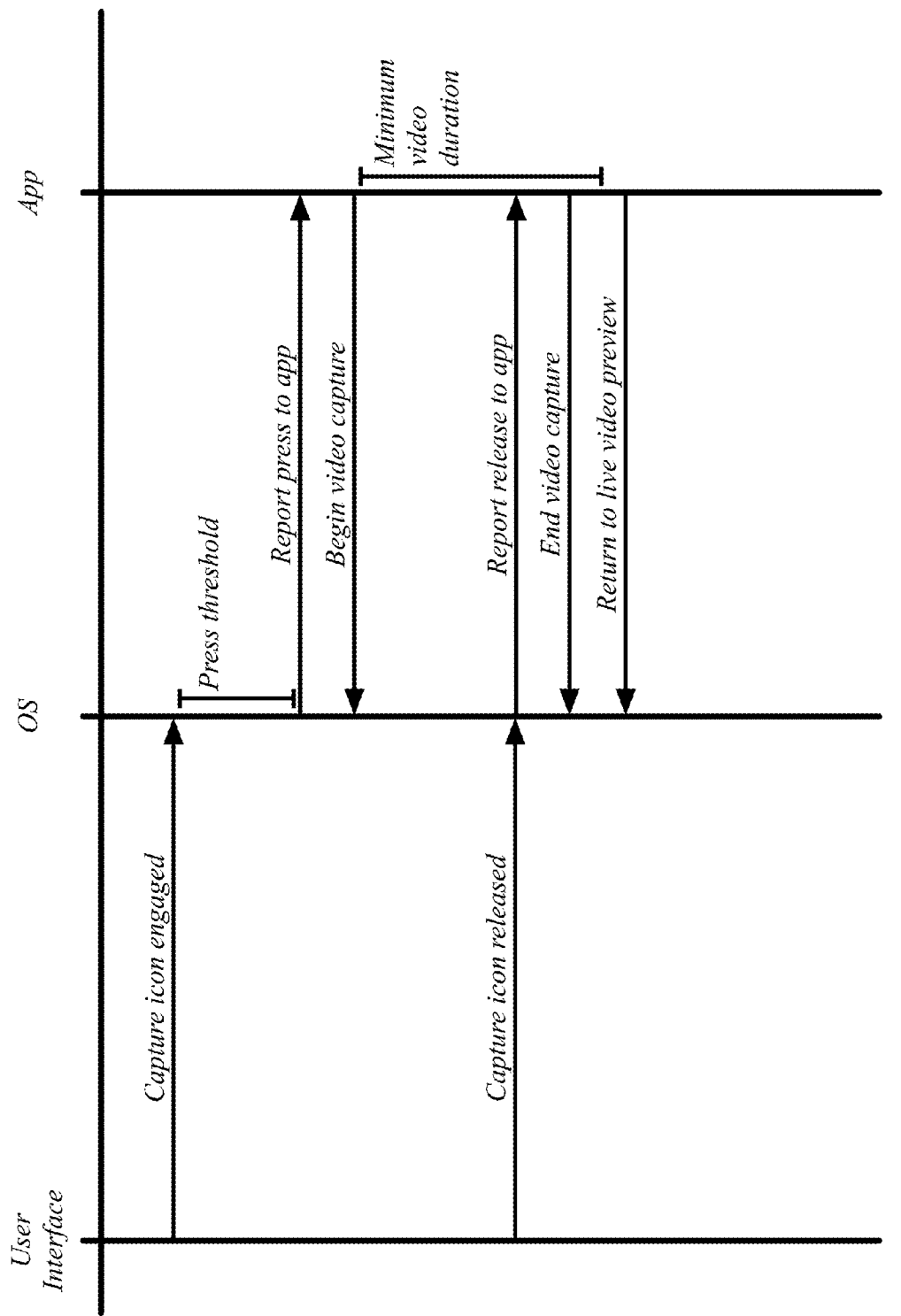
FIG. 8B illustrates a second interaction diagram for the visual media capture system receiving a press insufficiently long to meet a minimum video duration.

FIG. 8B illustrates a second interaction diagram for the visual media capture system 100 receiving a press insufficiently long to meet a minimum video duration.

As shown in FIG. 8, the user interface receives a capture icon being engaged, which is processed by an operating system (OS). The OS engages a timer with a press threshold with a set length to distinguish between a tap and a press. The user interface determines that the capture icon has been engaged for longer than the press threshold. As a result, the OS reports a press is being performed to the app, which may correspond to the visual media application 120. The app therefore directs the OS to begin capturing video.

The user interface receives the capture icon being released, which is processed by the OS. The OS reports that release of the press to the app. The app therefore directs the OS to end capturing video. As the minimum video duration has not been met, the OS is unable to return the video to the app. Because no video can be stored, the app directs the OS to return to live video preview.

Figure 9:
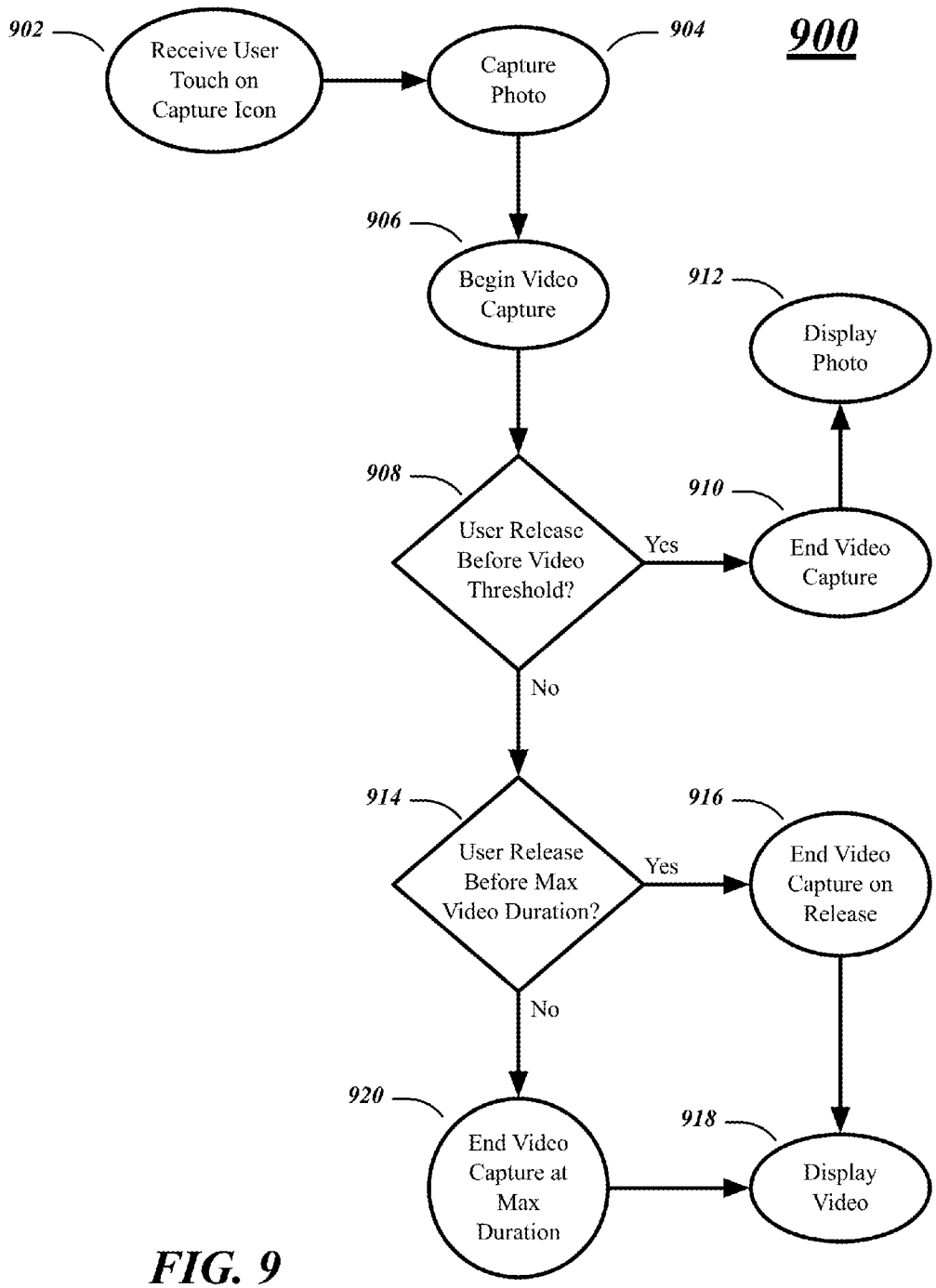
FIG. 9 illustrates an embodiment of a fourth logic flow for the visual media capture system of FIG. 1.

FIG. 9 illustrates an embodiment of a fourth logic flow 900 for the visual media capture system 100 of FIG. 1. The logic flow 900 may be representative of some or all of the operations executed by one or more embodiments described herein.

In the illustrated embodiment shown in FIG. 9, the logic flow 900 may receive a user touch on a capture icon at block 902. For example, the user touch may be received a haptic engagement signal. In response, the logic flow 900 may start a first timer configured to expire after a first preset duration.

The logic flow 900 may capture a photo at block 904. Capturing a photo may include configuring a camera 170 to be in a photo capture mode and then instructing the camera 170 to take a photo. The photo may be stored for future use.

The logic flow 900 may begin video capture at block 906. With the photo capture and stored, the user has a record of the scene before the camera at the time of the initial haptic engagement, and now video may be captured to accommodate the possibility that the user will continue haptic engagement for a sufficient duration as to indicate and allow for video capture. Beginning video capture may include configuring a camera 170 into a video capture mode. While the camera 170 may have been in a video capture mode prior to the photo being taken, in order to provide a live preview, it may have been switched into a photo capture mode for the photo to be taken. As such, the camera 170 may have to be switched back into the video capture mode for the video to be captured.

The logic flow 900 may determine whether user has released their touch—ending haptic engagement—before a video threshold has been reached. In some embodiments, the video threshold may correspond to the first preset duration distinguishing between a tap and a press, may correspond to the third preset duration tracking whether a minimum video length has been reached, may correspond to a combination of these user interface concepts, or may be a completely distinct threshold of time. Whether the video threshold has been reached may be determined according to a fourth timer started at either the initiation of video recording (particularly where the video threshold corresponds to minimum video duration) or the detection of haptic engagement (particularly where the video threshold corresponds to a press threshold), the fourth timer configured to expire after a fourth preset duration corresponding to the video threshold. Determining that the video threshold has been reached may therefore be performed by determining that the fourth timer has expired. If the user has released their touch before the video threshold is reached, the logic flow 900 may proceed to block 910. Otherwise, the logic flow 900 may proceed to block 914.

The logic flow 900 may end video capture at block 910. Ending video capture in this instance may correspond to indicating to an operating system or video capture library that the video should not be stored. Where the video threshold corresponds or is shorter than a minimum video duration, the visual media application 120 may not have the option of receiving any recorded video.

The logic flow 900 may display the photo at block 912.

The logic flow 900 may determine whether the user has released their touch before a max video duration at block 914. Determining that the user has released their touch may correspond to receiving a haptic disengagement signal from the touch screen 110. The max video duration may, for example, correspond to a maximum video duration supported by an Internet-based visual media sharing service. The maximum video duration may be 8 seconds, 10 seconds, or other duration appropriate for the recording of short interpersonal videos for sharing through a social networking service. If the user released before the max video duration, the logic flow 900 may continue to block 916. Otherwise, the logic flow 900 may proceed to block 920.

Whether the maximum video duration has been reached may be determined by starting a second timer at initiation of capturing the visual media 175 as video, the second timer configured to expire after a second preset duration. Determining that the maximum video duration has been reached may therefore be performed by determining that the second timer has expired. As such, the logic flow 900 may complete capture of the visual media 175 in response to determining that the second timer has expired.

The logic flow 900 may end video capture on release at block 916 and then proceed to block 918.

The logic flow 900 may display the captured video at block 918. In some embodiments, the logic flow 900 may display, or make available for display, both the photo and the video. As such, the user may have the option of selecting one or both of the photo for storage, transmission to other users, and/or uploading to a network server for a visual media sharing service or social networking service.

The logic flow 900 may end video capture at the max video duration at block 920 and then proceed to block 918 to display the captured video.

Figure 10:
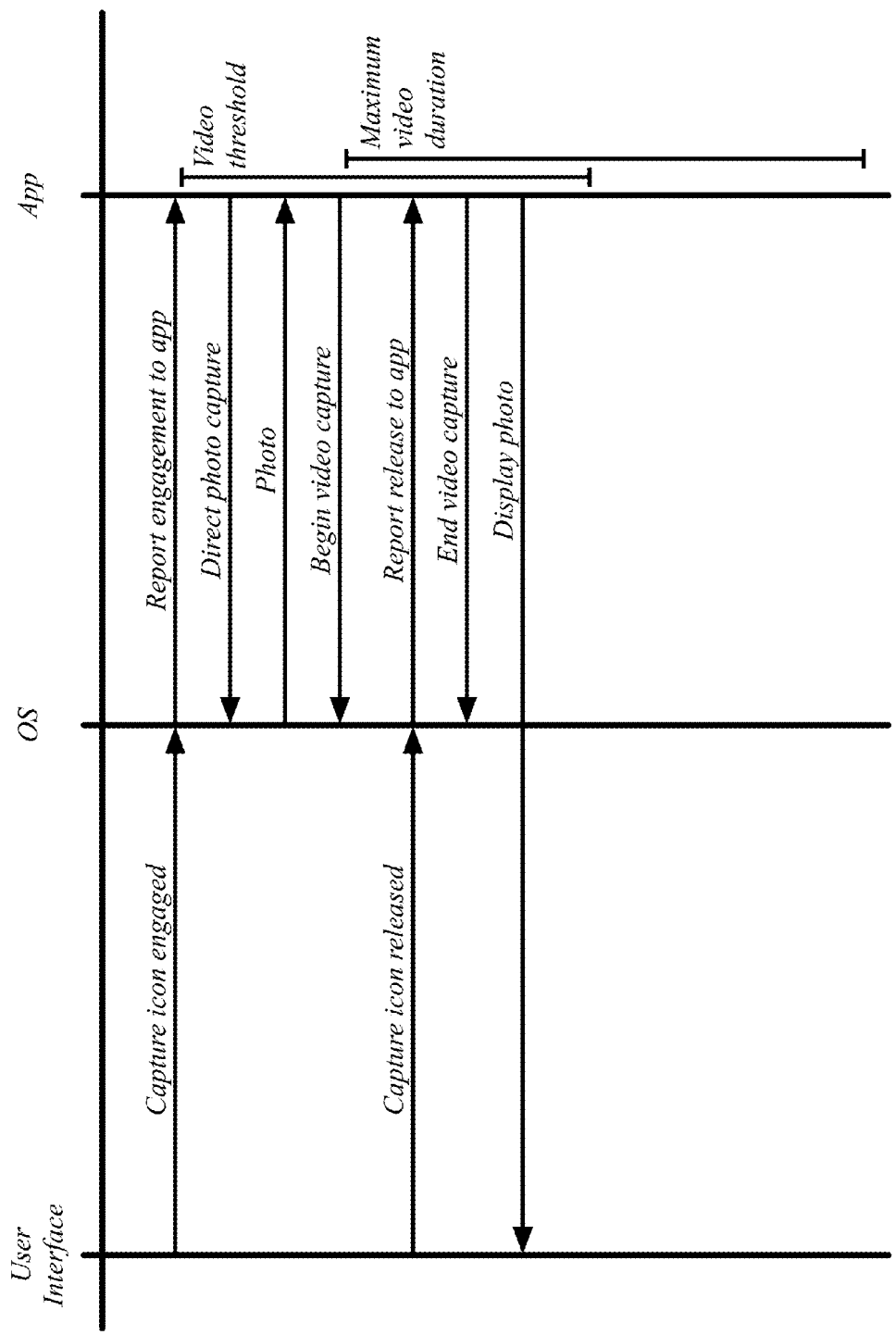
FIG. 10 illustrates an interaction diagram for the visual media capture system receiving a press insufficiently long to capture both a photo and video.

FIG. 10 illustrates an interaction diagram for the visual media capture system 100 receiving a press insufficiently long to capture both a photo and video.

As shown in FIG. 10, the user interface receives a capture icon being engaged, which is processed by an operating system (OS) and reported to an app. The app therefore directs the OS to capture a photo. The OS returns, in response, a photo. Once the photo is received by the app, the app directs the OS to begin capturing video.

The user interface receives the capture icon being released, which is processed by the OS and reported to the app. As the video threshold has not yet been reached, the app therefore directs the OS to end capturing video without returning the video to the app. The app then displays the photo on the user interface, with the OS serving as an intermediary.

In some embodiments, the video may be transferred to the app during capture, such as for the live display of the video as it is captured. In some embodiments, live display of the video as it captured may be provided by the OS, such as in an area of the screen specified by the app. In any embodiment, the video may be initially captured into short-term memory, for example a volatile form of memory such as dynamic random access memory (DRAM). The video may only be transferred to permanent, persistent, or other form of extended-duration storage, such as a hard disk or flash memory, upon conclusion of the capture. A distinction may be made between video being captured into short-term memory and being stored in long-term storage. As such, where the capture icon is released without the video threshold having been reached, the video may be captured but not stored.

Figure 11:
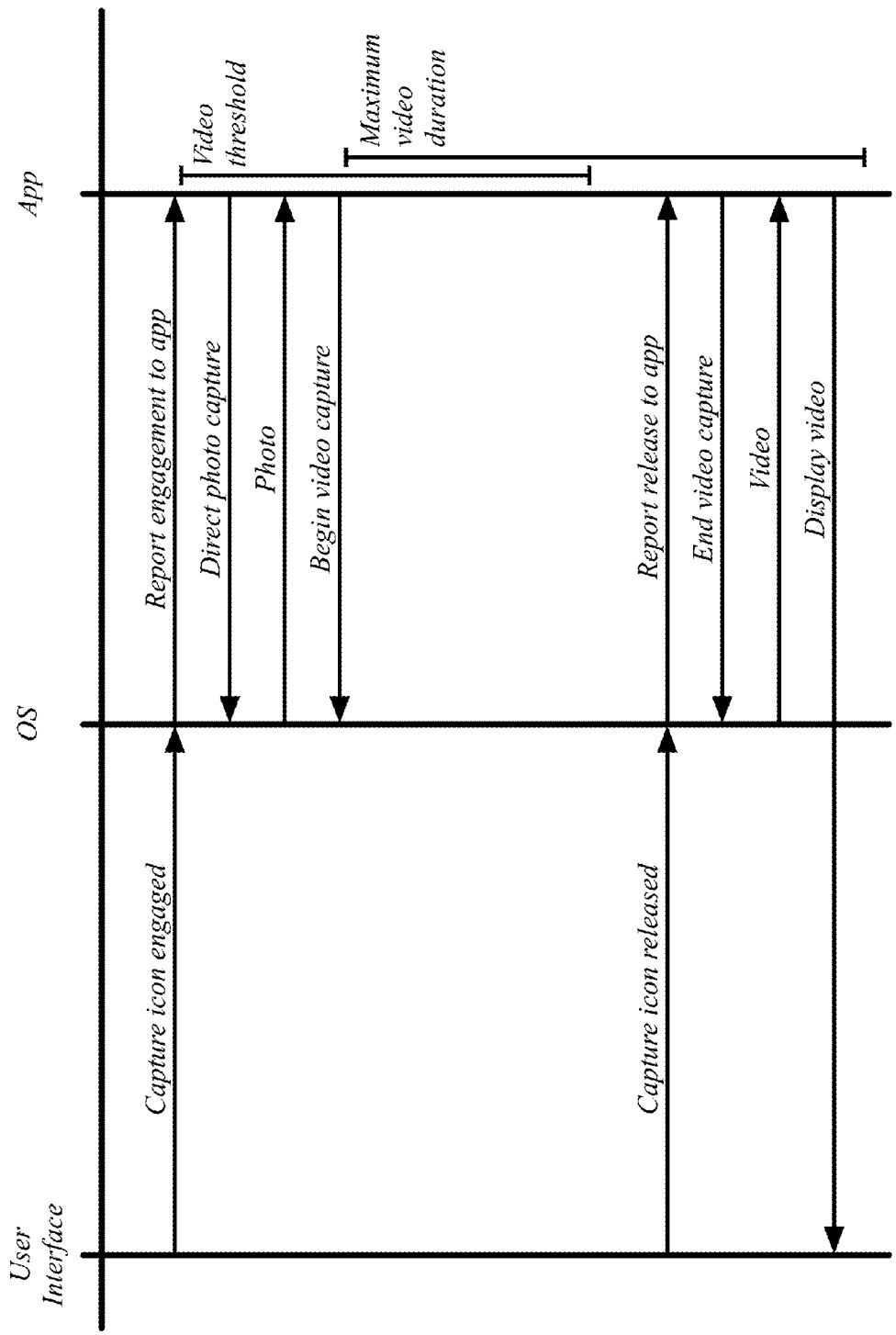
FIG. 11 illustrates an interaction diagram for the visual media capture system receiving a press sufficiently long to capture both a photo and video.

FIG. 11 illustrates an interaction diagram for the visual media capture system 100 receiving a press sufficiently long to capture both a photo and video.

As shown in FIG. 11, the user interface receives a capture icon being engaged, which is processed by an operating system (OS) and reported to an app. The app therefore directs the OS to capture a photo. The OS returns, in response, a photo. Once the photo is received by the app, the app directs the OS to begin capturing video.

The user interface receives the capture icon being released, which is processed by the OS and reported to the app. As the video threshold has been reached, the app directs the OS to end capturing video and return the video to the app. The app then displays the video on the user interface, with the OS serving as an intermediary.

As shown, the maximum video duration has not been reached in the illustration of FIG. 11. It will be appreciated that if the maximum video duration had been reached that video recording would have terminated and the video displayed. Conversely, while the minimum video duration is not shown in the illustration of FIG. 11, the described techniques related to minimum video duration may be combined with the techniques for immediate photo capture followed by video capture. For instance, in some embodiments, the video threshold may be equal in length to the minimum video duration.

As previously discussed, a distinction may be made between video being captured into short-term memory and being stored in long-term storage, such as flash memory. As such, where the capture icon is released after the video threshold has been reached, the capture of the video may be concluded and then the complete video may be stored by transferring the video from short-term memory to long-term storage. Specifically, the video may be stored based upon a second haptic contact signal (such as a haptic contact release signal) that occurs after a specified period of time after a first haptic contact signal (such as a haptic contact engagement signal).

As discussed, variations of the visual media capture system 100 receiving a press sufficiently long to capture both a photo and video may be implemented as well.

In one embodiment, for example, a non-transient computer readable storage medium may comprise executable instructions to process haptic contact signals from a display, record a photograph based upon a first haptic contact signal, and store a video based upon a second haptic contact signal, wherein the second haptic contact signal is a haptic contact release signal that occurs after a specified period of time after the first haptic contact signal. Storing the video may correspond to transferring the video from short-term memory to long-term storage.

In one embodiment, for example, a non-transient computer readable storage medium may comprise executable instructions to process haptic contact signals from a display. The executable instructions may record a photograph, in a photo mode, based upon a first haptic contact signal. The executable instructions may store a video based upon a second haptic contact signal, wherein the second haptic contact signal is a haptic contact release signal that occurs after a specified period of time after the first haptic contact signal.

The first haptic contact signal may be received on a portion of the display corresponding to a capture icon displayed on the display. The second haptic contact signal being a haptic contact release signal may indicate that haptic contact is sustained between the first haptic contact signal and the second haptic contact signal. This haptic contact may be sustained on the portion of the display corresponding to the displayed capture icon. In some embodiments, the user may be permitted to wander the haptic contact in a wider area than corresponds to the capture icon during capture. This may serve to avoid accidental termination of video recording due to shifting of the capture device (e.g., smartphone) or the user's hand during capture, as may occur, for example, as a user moves the capture device in order to keep a target within the capture frame. This wider area may be a specified area of the display around the capture icon. In some embodiments, the cessation of haptic contact on the capture icon may be considered a haptic contact release signal, resulting in termination of recording, despite haptic contact potentially continuing outside the area of the capture icon. In some embodiments, the cessation of haptic contact on either the capture icon or the wider area may also be considered a haptic contact release signal, resulting in termination of recording, despite haptic contact potentially continuing outside the area of the capture icon and the wider area. As such, haptic contact release or haptic disengagement may be specifically determined according to a particular area of the screen, rather than in regards to the entire surface of a touch-sensitive screen.

In one embodiment, for example, an electronic device may comprise one or more digital image sensors to capture visual media in a photo mode and a video mode. The electronic device may further comprise a display to present the visual media from the digital image sensors. The electronic device may further comprise a touch controller to identify haptic contact engagement, haptic contact persistence and haptic contact release on the display. The electronic device may further comprise a visual media capture controller to alternately store the visual media as a photograph or a video based upon an evaluation of the time period between the haptic contact engagement and the haptic contact release.

In some embodiments, the electronic device may comprise an illumination element. The illumination element may be selectively employed in low-light situation in order to provide increased visibility of the subject(s) of a photo or video. The illumination element may be capable of operation in both a photo-specific mode and a video-specific mode. In a photo-specific mode, the illumination element may operate as a near-instantaneous flash. In a video-specific mode, the illumination element may operate as a sustained source of light, providing illumination for the full duration of the video. Alternatively, in some embodiments distinct illumination elements may be used for photo capture and video capture. As such, engaging an illumination element in a photo-specific mode may comprise engaging a photo-specific illumination element. Similarly, engaging an illumination element in a video-specific mode may comprise engaging a video-specific illumination element. The visual media capture component 140 may be operative to engage an illumination element in a photo-specific mode while recording the photograph. The visual media capture component 140 may be operative to engage an illumination element in a video-specific mode while recording the video. It will be appreciated that the decision to use an illumination element or not may be determined based on lighting levels as perceived by the capture element and according to user selection.

The display may display the captured photo or video to the user. In some embodiments, the display may make available both the photo and the video for viewing and allow the user to select one or both for storage and/or sharing. For instance, the photo and video may be displayed in a split-screen view, sharing the display, with the user able to select one or both in this split-screen view for tagging, storage, and sharing. Alternatively, where only a photo is stored, the video either never captured or discarded, only the photo may be displayed. Where both a photo and video are captured, the video may be preferentially displayed, but with the user able to select the photo for viewing such as by selecting a photo icon overlaid on the display of the video.

These are merely a few exemplary variations of the visual media capture system 100 receiving a press sufficiently long to capture both a photo and video, and others may be implemented as well. Embodiments are not limited in this context.

Figure 12:
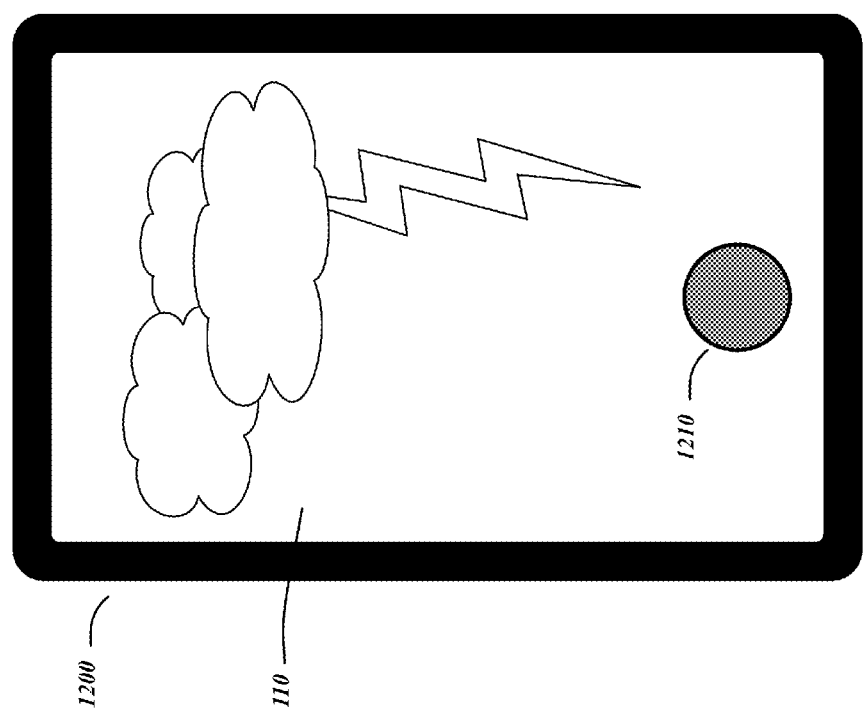
FIG. 12 illustrates a user interface for the visual media capture system of FIG. 1.

FIG. 12 illustrates an embodiment of a smartphone device 1200 displaying a user interface for the visual media capture system 100 of FIG. 1.

As shown in FIG. 12, smartphone device 1200 is displaying a live video preview of the scene, a lightning storm in progress, being received by the camera 170. The scene is being displayed on touch screen 110 of the smartphone device. The user interface includes a user interface element 1210, displayed as a circular visual media capture icon. The live video preview may be both the standard initial display upon the visual media application 120 being opened and the default display that the visual media application 120 returns to once a photo or video has been captured and the user has finished examining it, tagging it, and/or sending it.

If the user interface element 1210 is touched by a user, it is registered by the touch screen 110 and reported to the visual media application 120 as haptic signals 115. Depending on the duration of the user's contact with the user interface element 1210 a photo may be captured and stored, a video may be captured and stored, or both a photo and video may be captured and stored.

The user interface element 1210 may change during photo and/or video capture to provide feedback to the user. For example, the user interface element 1210 may indicate the progress or time remaining of any, some, or all of the first timer, second timer, third timer, and video threshold. The user interface element 1210 may change to indicate that video capture is in progress. Alternatively or additionally, other user interface elements may be introduced to indicate capture mode and progress of any of the timers or progress towards the video threshold.

In some embodiments, the user may be required to have at least a portion of the area of the touch screen 110 they make contact with to include the area of the screen covered by the user interface element 1210. However, the user's contact with the touch screen 110 may be allowed to wander from the user interface element 1210 during capture. This allowance may be defined relative to the user's initial area of contact with the user interface element 1210, such as by allowing the user's contact to wander anywhere within an area around their initial area of contact. This allowance may be defined relatively to only the user interface element 1210, such as by allowing the user's contact to wander anywhere within an expanded region around the user interface element 1210.

It will be appreciated that additional user interface elements may be displayed on the touch screen 110. For example, an icon may be displayed to allow for the selection of an illumination mode, such a selection that additional illumination should always be used during capture, a selection that additional illumination should never be used during capture, or a selection that additional illumination should only be used if the capture device determines it to be advantageous. The capture device may determine whether additional illumination would be advantageous using any of the known techniques for automatic configuration of a flash or other illumination element.

Figure 13:
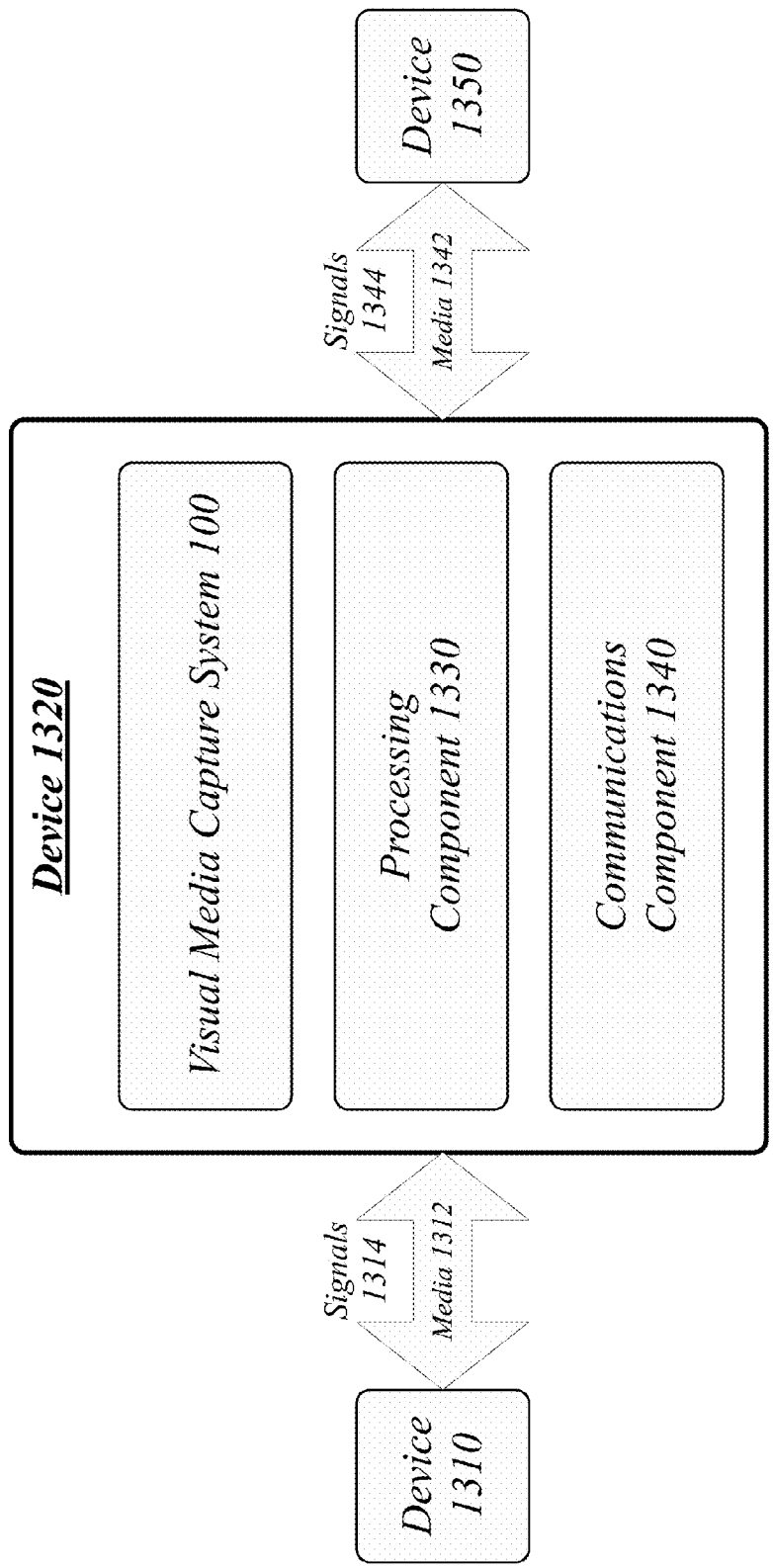
FIG. 13 illustrates an embodiment of a centralized system for the system of FIG. 1.

FIG. 13 illustrates a block diagram of a centralized system 1300. The centralized system 1300 may implement some or all of the structure and/or operations for the visual media capture system 100 in a single computing entity, such as entirely within a single device 1320.

The device 1320 may comprise any electronic device capable of receiving, processing, and sending information for the visual media capture system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 1320 may execute processing operations or logic for the visual media capture system 100 using a processing component 1330. The processing component 1330 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 1320 may execute communications operations or logic for the visual media capture system 100 using communications component 1340. The communications component 1340 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1340 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1312, 1342 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 1320 may communicate with other devices 1310, 1350 over a communications media 1312, 1342, respectively, using communications signals 1314, 1344, respectively, via the communications component 1340. The devices 1310, 1350 may be internal or external to the device 1320 as desired for a given implementation. For example, device 1310 may correspond to a second user device, such as a second smartphone, used by a second user of the visual media application 120. Signals 1314 sent over media 1312 may correspond to the transmission of visual media 175 from device 1320 to the user of device 1310. In another example, device 1350 may correspond to a network server device, such as may be operated by a visual media sharing service or social networking service. Signals 1344 sent over media 1342 may correspond to the transmission of visual media 175 from the device 1320 to the device 1350 for storage and possible retrieval by another user of the visual media sharing or social networking service.

Figure 14:
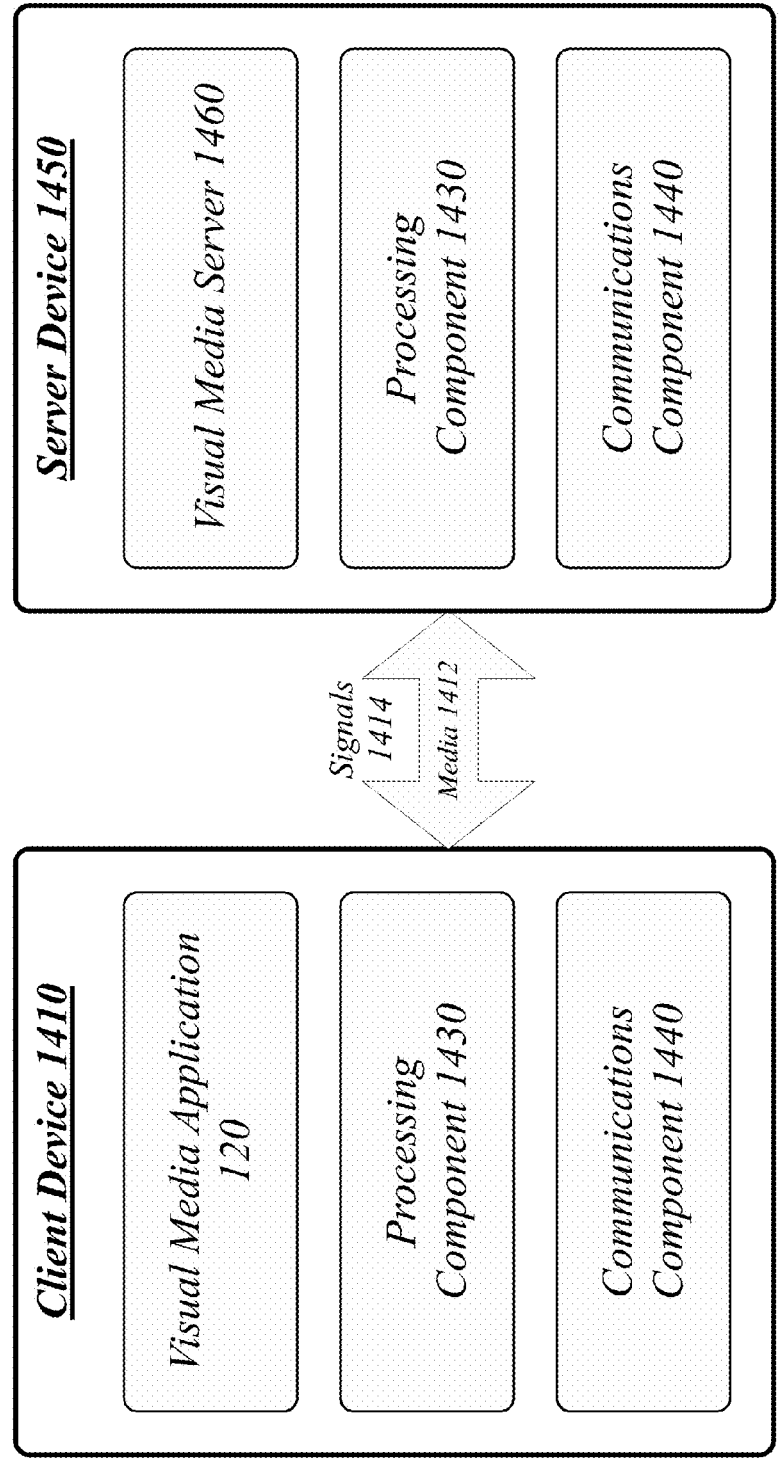
FIG. 14 illustrates an embodiment of a distributed system for the system of FIG. 1.

FIG. 14 illustrates a block diagram of a distributed system 1400. The distributed system 1400 may distribute portions of the structure and/or operations for the visual media capture system 100 across multiple computing entities. Examples of distributed system 1400 may include without limitation a client-server architecture, a S-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1400 may comprise a client device 1410 and a server device 1450. In general, the client device 1410 and the server device 1450 may be the same or similar to the client device 820 as described with reference to FIG. 13. For instance, the client system 1410 and the server system 1450 may each comprise a processing component 1430 and a communications component 1440 which are the same or similar to the processing component 1330 and the communications component 1340, respectively, as described with reference to FIG. 13. In another example, the devices 1410, 1450 may communicate over a communications media 1412 using communications signals 1414 via the communications components 1440.

The client device 1410 may comprise or employ one or more client programs that operate to perform various methodologies in accordance with the described embodiments. In one embodiment, for example, the client device 1410 may implement the visual media application 120.

The server device 1450 may comprise or employ one or more server programs that operate to perform various methodologies in accordance with the described embodiments. In one embodiment, for example, the server device 1450 may implement a visual media server 1460.

The visual media server 1460 may correspond to a network server provided by the operator of a visual media sharing service or social networking service. Signals 1414 sent over media 1412 may correspond to the transmission of visual media 175 from the client device 1410 to the server device 1450. Visual media server 1460 may be operative to receive the visual media 175 and store visual media 175 in association with a user account for a user of client device 1410. Visual media 175 stored on server device 1450 may be accessible to other users of the visual media sharing service or social networking service as determined by the user of client device 1410. For example, signals 1414 may include a list of other users authorized to retrieve the visual media 175. Signals 141 may include a list of other users to be notified by the visual media sharing service or social networking service that visual media 175 is available to them. Visual media server 1460 may be generally operative to receive, store, transmit, and otherwise manage visual media 175 on behalf of a user of client device 1410 and its service in general.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 15:
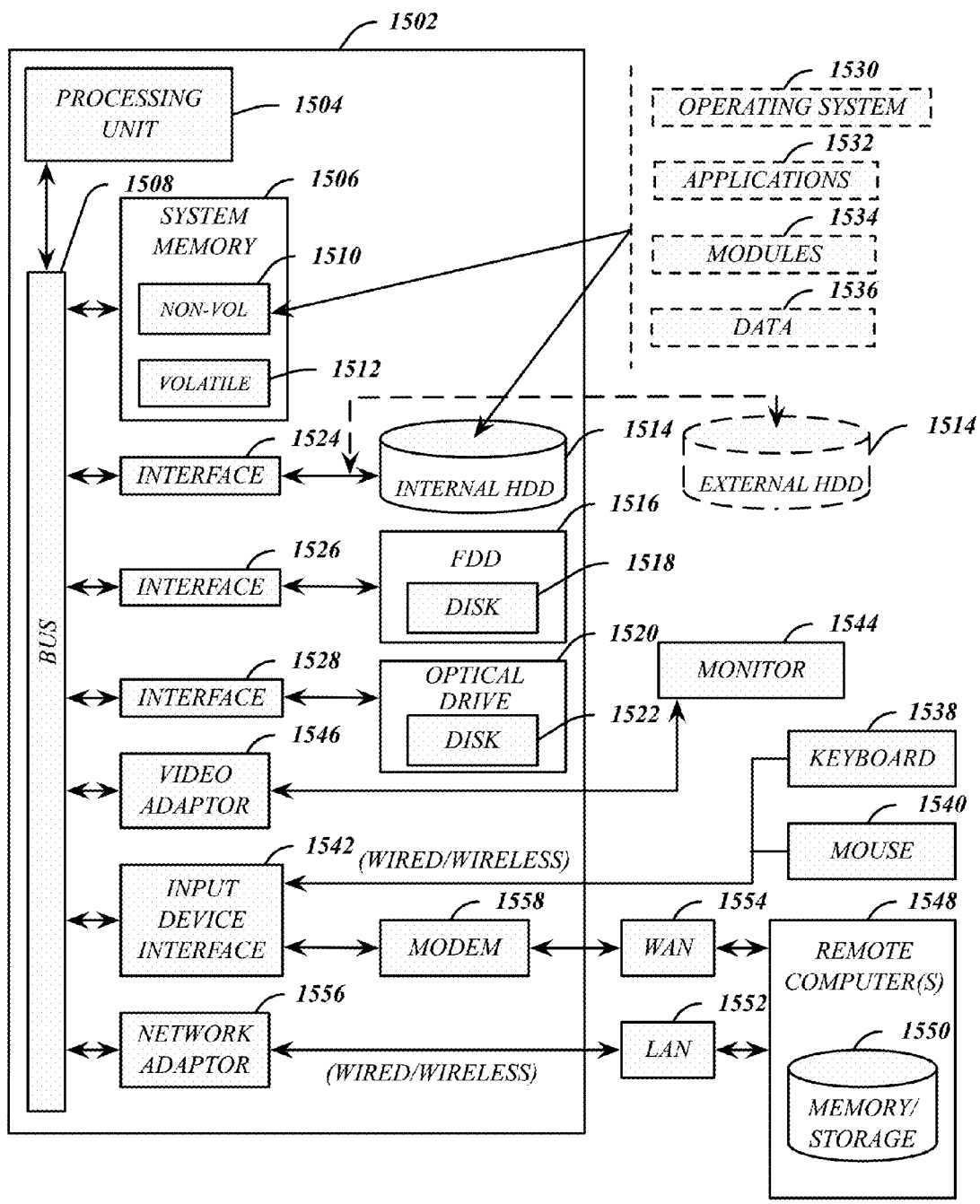
FIG. 15 illustrates an embodiment of a computing architecture.

FIG. 15 illustrates an embodiment of an exemplary computing architecture 1500 suitable for implementing various embodiments as previously described. In one embodiment, the computing architecture 1500 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1500.

As shown in FIG. 15, the computing architecture 1500 comprises a processing unit 1504, a system memory 1506 and a system bus 1508. The processing unit 1504 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1504.

The system bus 1508 provides an interface for system components including, but not limited to, the system memory 1506 to the processing unit 1504. The system bus 1508 can be any of several types of bus structure that may further interconnect to a memory bus (with or without a memory controller), a peripheral bus, and a local bus using any of a variety of commercially available bus architectures. Interface adapters may connect to the system bus 1508 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1500 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 15, the system memory 1506 can include non-volatile memory 1510 and/or volatile memory 1512. A basic input/output system (BIOS) can be stored in the non-volatile memory 1510.

The computer 1502 may include various types of computer-readable storage media in the form of one or more lower speed memory units, including an internal (or external) hard disk drive (HDD) 1514, a magnetic floppy disk drive (FDD) 1516 to read from or write to a removable magnetic disk 1518, and an optical disk drive 1520 to read from or write to a removable optical disk 1522 (e.g., a CD-ROM or DVD). The HDD 1514, FDD 1516 and optical disk drive 1520 can be connected to the system bus 1508 by a HDD interface 1524, an FDD interface 1526 and an optical drive interface 1528, respectively. The HDD interface 1524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1510, 1512, including an operating system 1530, one or more application programs 1532, other program modules 1534, and program data 1536. In one embodiment, the one or more application programs 1532, other program modules 1534, and program data 1536 can include, for example, the various applications and/or components of the visual media capture system 100.

A user can enter commands and information into the computer 1502 through one or more wire/wireless input devices, for example, a keyboard 1538 and a pointing device, such as a mouse 1540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1504 through an input device interface 1542 that is coupled to the system bus 1508, but can be connected by other interfaces such as a parallel port, IEEE 1394 serial port, a game port, a USB port, an IR interface, and so forth.

A monitor 1544 or other type of display device is also connected to the system bus 1508 via an interface, such as a video adaptor 1546. The monitor 1544 may be internal or external to the computer 1502. In addition to the monitor 1544, a computer typically includes other peripheral output devices, such as speakers, printers, and so forth.

The computer 1502 may operate in a networked environment using logical connections via wire and/or wireless communications to one or more remote computers, such as a remote computer 1548. The remote computer 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wire/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computer 1502 is connected to the LAN 1552 through a wire and/or wireless communication network interface or adaptor 1556. The adaptor 1556 can facilitate wire and/or wireless communications to the LAN 1552, which may also include a wireless access point disposed thereon for communicating with the wireless functionality of the adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wire and/or wireless device, connects to the system bus 1508 via the input device interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with wire and wireless devices or entities using the IEEE 802 family of standards, such as wireless devices operatively disposed in wireless communication (e.g., IEEE 802.15 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.15x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 16:
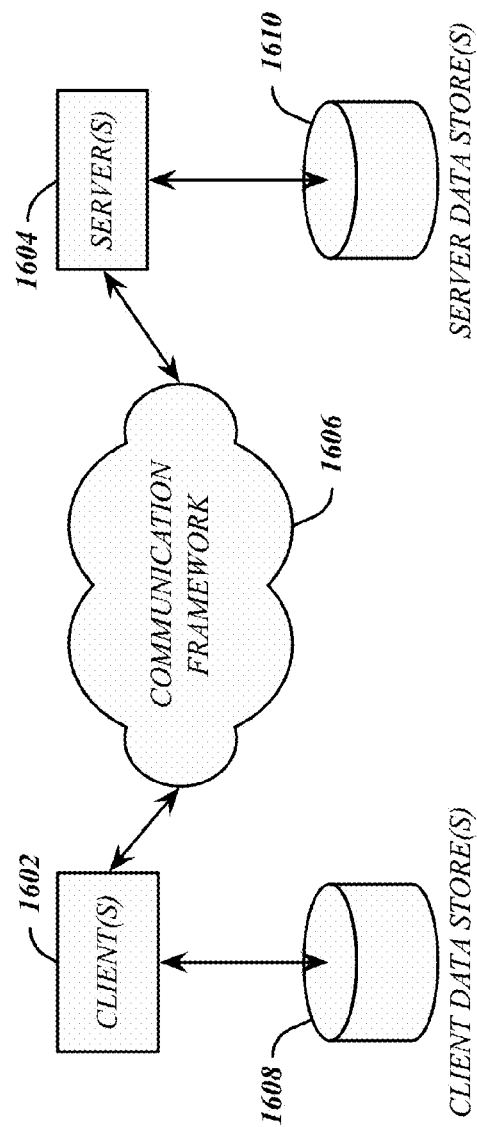
FIG. 16 illustrates an embodiment of a communications architecture.

FIG. 16 illustrates a block diagram of an exemplary communications architecture 1600 suitable for implementing various embodiments as previously described. The communications architecture 1600 includes various common communications elements, such as a transmitter, receiver, transceiver, radio, network interface, baseband processor, antenna, amplifiers, filters, power supplies, and so forth. The embodiments, however, are not limited to implementation by the communications architecture 1600.

As shown in FIG. 16, the communications architecture 1600 comprises includes one or more clients 1602 and servers 1604. The clients 1602 may implement the client device 910. The servers 1604 may implement the server device 950. The clients 1602 and the servers 1604 are operatively connected to one or more respective client data stores 1608 and server data stores 1610 that can be employed to store information local to the respective clients 1602 and servers 1604, such as cookies and/or associated contextual information.

The clients 1602 and the servers 1604 may communicate information between each other using a communication framework 1606. The communications framework 1606 may implement any well-known communications techniques and protocols. The communications framework 1606 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1606 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1602 and the servers 1604. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
receiving a haptic engagement signal;
starting a first timer in response to receiving the haptic engagement signal, the first timer configured to expire after a first preset duration;

selecting a capture mode as one of a photo capture mode or a video capture mode based on whether a haptic disengagement signal is received before expiration of the first timer;

capturing visual media using the selected capture mode; and starting a third timer at initiation of capturing the visual media as video, the third timer configured to expire after a third preset duration, wherein: if the haptic disengagement signal is received after expiration of the first timer and before expiration of the third timer, capture of the visual media in response to receiving the haptic disengagement signal after expiration of the first timer and before expiration of the third timer is canceled.

2. The method of claim 1, comprising:

receiving the haptic disengagement signal before expiration of the first timer;

configuring a visual media capture controller in the photo capture mode in response to receiving the haptic disengagement signal before expiration of the first timer; and capturing the visual media as a photograph.

3. The method of claim 1, comprising:

determining that the first timer has expired;

configuring a visual media capture controller in the video capture mode in response to determining that the first timer has expired; and capturing the visual media as a video.

4. The method of claim 3, comprising:

receiving the haptic disengagement signal after expiration of the first timer; and completing capture of the visual media in response to receiving the haptic disengagement signal.

5. The method of claim 3, comprising:

starting a second timer at initiation of capturing the visual media as video, the second timer configured to expire after a second preset duration;

determining that the second timer has expired; and completing capture of the visual media in response to determining that the second timer has expired.

6. The method of claim 1, comprising:

displaying the captured visual media;

receiving a user command to transmit the captured visual media; and uploading the captured visual media to a network server in response to the received user command.

7. An apparatus, comprising:

a processor circuit on a device;

a touch controller operative to receive a haptic engagement signal;

a visual media capture controller operative to be configured in a capture mode based on whether a haptic disengagement signal is received by the touch controller before expiration of a first timer, the capture mode one of a photo capture mode or video capture mode, the first timer started in response to receiving the haptic engagement signal, the first timer configured to expire after a first preset duration; and a storage device operative to store visual media captured by the visual media capture controller in the configured capture mode, wherein:

the touch controller is operative to receive the haptic disengagement signal after expiration of the first timer and before expiration of a third timer, the third timer started at initiation of capturing the visual media as video, the third timer configured to expire after a third preset duration, and the visual media capture controller is operative to cancel capture of the visual media in response to the touch controller receiving the haptic disengagement signal before expiration of the third timer.

8. The apparatus of claim 7, further comprising:

the touch controller operative to receive the haptic disengagement signal before expiration of the first timer;

the visual media capture controller operative to be configured in the photo capture mode in response to receiving the haptic disengagement signal before expiration of the first timer and capture the visual media as a photograph.

9. The apparatus of claim 7, further comprising:

the visual media capture controller operative to be configured in the video capture mode in response to determining that the first timer has expired and capture the visual media as a video.

10. The apparatus of claim 9, further comprising:

the touch controller operative to receive the haptic disengagement signal after expiration of the first timer; and the visual media capture controller operative to complete capture of the visual media in response to the touch controller receiving the haptic disengagement signal.

11. The apparatus of claim 9, further comprising:

the visual media capture controller operative to complete capture of the visual media in response to determining that a second timer has expired, the second timer started at initiation of capturing the visual media as video, the second timer configured to expire after a second preset duration.

12. The apparatus of claim 7, further comprising:

a display component operative to display the captured visual media;

the touch controller operative to receive a user command to transmit the captured visual media; and the storage device operative to upload the captured visual media to a network server in response to the received user command.

13. At least one non-transitory computer-readable storage medium comprising instructions that, when executed, cause a system to:

receive a haptic engagement signal;

start a first timer in response to receiving the haptic engagement signal, the first timer configured to expire after a first preset duration;

select a capture mode as one of a photo capture mode or a video capture mode based on whether a haptic disengagement signal is received before expiration of the first timer;

capture visual media using the selected capture mode; and start a third timer at initiation of capturing the visual media as video, the third timer configured to expire after a third preset duration, wherein: if the haptic disengagement signal is received after expiration of the first timer and before expiration of the third timer, capture of the visual media in response to receiving the haptic disengagement signal after expiration of the first timer and before expiration of the third timer is canceled.

14. The non-transitory computer-readable storage medium of claim 13, comprising further instructions that, when executed, cause a system to:

receive the haptic disengagement signal before expiration of the first timer;

configure a visual media capture controller in the photo capture mode in response to receiving the haptic disengagement signal before expiration of the first timer; and capture the visual media as a photograph.

15. The non-transitory computer-readable storage medium of claim 13, comprising further instructions that, when executed, cause a system to:
  determine that the first timer has expired;
  configure a visual media capture controller in the video capture mode in response to determining that the first timer has expired; and
  capture the visual media as a video.

16. The non-transitory computer-readable storage medium of claim 15, comprising further instructions that, when executed, cause a system to:
  receive the haptic disengagement signal after expiration of the first timer; and
  complete capture of the visual media in response to receiving the haptic disengagement signal.

17. The non-transitory computer-readable storage medium of claim 15, comprising further instructions that, when executed, cause a system to:
  start a second timer at initiation of capturing the visual media as video, the second timer configured to expire after a second preset duration;
  determine that the second timer has expired; and
  complete capture of the visual media in response to determining that the second timer has expired.

18. The non-transitory computer-readable storage medium of claim 15, comprising further instructions that, when executed, cause a system to:
  start a third timer at initiation of capturing the visual media as video, the third timer configured to expire after a third preset duration;
  receive the haptic disengagement signal after expiration of the first timer and before expiration of the third timer; and
  cancel capture of the visual media in response to receiving the haptic disengagement signal after expiration of the first timer and before expiration of the third timer.

19. The non-transitory computer-readable storage medium of claim 15, comprising further instructions that, when executed, cause a system to:
  display the captured visual media;
  receive a user command to transmit the captured visual media; and
  upload the captured visual media to a network server in response to the received user command.

* * * * *